(12) United States Patent
Carnathan

(10) Patent No.: US 10,556,320 B2
(45) Date of Patent: Feb. 11, 2020

(54) COMPUTERIZED METHOD AND APPARATUS FOR AUTOMATED SAND BLASTING

(71) Applicant: James T. Carnathan, Mena, AR (US)

(72) Inventor: James T. Carnathan, Mena, AR (US)

( * ) Notice: Subject to any disclaimer, the term of this patent is extended or adjusted under 35 U.S.C. 154(b) by 107 days.

(21) Appl. No.: 15/863,055

(22) Filed: Jan. 5, 2018

(65) Prior Publication Data
US 2018/0193980 A1 Jul. 12, 2018

Related U.S. Application Data

(60) Provisional application No. 62/443,669, filed on Jan. 7, 2017.

(51) Int. Cl.
| | |
|---|---|
| *B24C 3/06* | (2006.01) |
| *B24C 1/04* | (2006.01) |
| *B24C 3/32* | (2006.01) |
| *B44C 1/22* | (2006.01) |
| *B24C 3/08* | (2006.01) |

(Continued)

(52) U.S. Cl.
CPC ............... *B24C 3/06* (2013.01); *B24C 1/045* (2013.01); *B24C 3/08* (2013.01); *B24C 3/32* (2013.01); *B44C 1/221* (2013.01); *B24C 9/003* (2013.01); *E04H 13/003* (2013.01); *G05B 2219/49114* (2013.01); *G05B 2219/50151* (2013.01)

(58) Field of Classification Search
CPC .... B24C 3/06; B24C 3/08; B24C 3/32; B24C 1/045; B24C 9/03; B44C 1/121; E04H 13/003; G05B 2219/49114; G05B 2219/50151

USPC ........................................................ 451/29
See application file for complete search history.

(56) References Cited

U.S. PATENT DOCUMENTS

| | | | |
|---|---|---|---|
| 1,415,403 A * | 5/1922 | Ruemelin ............... | B24C 3/06 451/84 |
| 1,594,603 A | 8/1926 | Chase | |
| 3,267,621 A | 8/1966 | Meyers | |

(Continued)

*Primary Examiner* — George B Nguyen
(74) *Attorney, Agent, or Firm* — Stephen D. Carver

(57) ABSTRACT

A computerized method and apparatus for high pressure grit or sand blasting comprises an upright cabinet through which work pieces, supported by a roller conveyor, can be disposed for blasting. An elongated actuator assembly horizontally extending across the enclosure interior comprises a pair of rigid, spaced-apart, rails upon which a displaceable carriage can move. The carriage supports a sand blasting head and nozzle. An internal tape within the actuator assembly moves the carriage. Tape condition is monitored by software in response to a magnetic sender driven by the tape idler pulley and an adjacent Hall effect sensor that picks up timed pulses. The actuator assembly is braced by buffer wheel assemblies at each end, in contact with vertical guide rails at each cabinet interior end. The hose-fed sand blasting head secured to the carriage directs sand or towards a target work piece be processed. The actuator assembly is vertically displaceable via cables controlled by an overhead servo motor, so that the sand blasting nozzle may be displaced in both horizontal and vertical. A programmable logic controller, armed with suitable software, provides operator menus for initiating various steps used in setup options, executing blast functions, moving the carriage blasting.

20 Claims, 27 Drawing Sheets

(51) Int. Cl.
*B24C 9/00* (2006.01)
*E04H 13/00* (2006.01)

(56) References Cited

U.S. PATENT DOCUMENTS

| | | | |
|---|---|---|---|
| 3,516,205 A | 6/1970 | Thomson | |
| 3,916,050 A | 10/1975 | Kurhajee | |
| 4,430,416 A | 2/1984 | Goto | |
| 4,801,490 A | 1/1989 | Schuette | |
| 5,117,366 A | 5/1992 | Stong | |
| 5,132,510 A | 7/1992 | Klingel | |
| 5,182,882 A * | 2/1993 | Brodene | B24C 3/12 |
| | | | 451/36 |
| 5,304,773 A | 4/1994 | Kilian | |
| 5,360,486 A * | 11/1994 | Elliott | B08B 7/02 |
| | | | 134/6 |
| 5,568,189 A | 10/1996 | Kneller | |
| 5,765,578 A * | 6/1998 | Brandt | B08B 7/0021 |
| | | | 134/37 |
| 5,782,677 A * | 7/1998 | Kanouse | B24B 31/023 |
| | | | 241/182 |
| 5,833,516 A * | 11/1998 | De Haas | B24C 1/04 |
| | | | 451/29 |
| 5,854,460 A | 12/1998 | Graf | |
| 6,244,934 B1 * | 6/2001 | Miyai | B24C 3/325 |
| | | | 451/29 |
| 6,866,561 B2 * | 3/2005 | Andrews | B24C 1/04 |
| | | | 451/29 |
| 8,449,350 B2 * | 5/2013 | Pei | B24C 1/04 |
| | | | 451/102 |
| 2001/0025459 A1 | 10/2001 | Barnes | |
| 2003/0092364 A1 * | 5/2003 | Erickson | B24C 1/045 |
| | | | 451/75 |
| 2006/0111025 A1 * | 5/2006 | Yanaka | B24C 1/08 |
| | | | 451/75 |
| 2010/0035522 A1 * | 2/2010 | Mase | B24C 1/04 |
| | | | 451/38 |
| 2013/0025422 A1 * | 1/2013 | Chillman | B24C 1/045 |
| | | | 83/53 |
| 2014/0045409 A1 * | 2/2014 | Zhang | B24C 7/0046 |
| | | | 451/2 |
| 2015/0107030 A1 * | 4/2015 | Regan | B29C 44/5627 |
| | | | 12/38 |
| 2016/0039048 A1 * | 2/2016 | Giguere | B24C 1/045 |
| | | | 219/121.44 |
| 2016/0318153 A1 * | 11/2016 | Kaga | B24C 3/085 |

* cited by examiner

COMPUTERIZED METHOD AND APPARATUS FOR AUTOMATED SAND BLASTING

CROSS REFERENCE TO RELATED APPLICATION

This utility application is based upon, and claims priority from, prior U.S. Provisional Patent application entitled "Computerized Method And Apparatus for Automated Sand Blasting," filed Jan. 7, 2017, U.S. Ser. No.: 62/443,669, by inventor James T. Carnathan, which is hereby incorporated by reference.

BACKGROUND OF THE INVENTION

I. Field of the Invention

The present invention relates generally to high pressure, sand blasting carving systems for imprinting, cutting, and/or ornamenting items comprised of stone, marble, brick, metal, concrete and other relatively hard substances. More particularly, the present invention relates to a computerized, high pressure, sand or grit blasting system especially adapted for computer-lettering and imprinting rigid, stencil-equipped items such as graveside monuments and the like.

II. Description of the Prior Art

Sandblast stencils for inscribing or marking hard surfaces, such as stone or granite, marble, glass, brick, glass, and concrete, are well known by those skilled in the art. Suitable stencils can be formed from abrasion-resistant, sheet material through which desired ornamental markings comprising lettering, pictures, images, designs or artwork are pre-cut by various well-known means. The stencil can then be adhered to the desired surface of the work piece, and thereafter a high-pressure stream of fast-moving, abrasive particles can be directed towards the work piece to form the desired designs. The exposed portion of the work piece surface, unprotected by stencil material, is thus abraded and marked. Of course, portions of the work piece that are masked by the stencil are generally unaffected.

In sand or "grit blasting" a jet of hard, abrasive particles is directed against the face of the article to be imprinted. The resulting image is formed upon the surface of the work piece through exposed portions of the stencil. By carefully controlling the areas which are sandblasted, a contrasting array of eroded and smooth areas can be produced on the work piece in the form of pictures, artistic designs, markings, inscriptions, lettering, and the like.

Known sand blasting techniques have been applied to glass products, and to the smooth, glass-like surfaces of granite memorials or tombstones. Permanent decorative designs can thus be developed on various types of glass articles such as windows, drinking glasses, and mirrors. etc. The sandblasting erodes the glass to produce a cut-away area which has a "frosted" appearance. The frosted appearance of the sand-blasted portion provides an effective contrast for the untouched smooth transparent portion of the glass.

Conventional methods of forming images on glass or similar materials include etching, carving, and grinding processes. Etching is a chemical process in which exposed surfaces of a glass work piece are etched away. Patterns are created by allowing the etching solution, comprising for example, solutions of hydrofluoric acid, to touch only the areas to be etched. Carving by means sand blasting is similar to etching, except that the sand blasting process typically cuts deeper into the surface. Carving can include surface effects, but is characterized typically by deep cuts into the surface of the panel. Grinding processes employ a grinding wheel, including carborundum units, that cut rather imprecisely into the work piece surface. High quality results are easier to achieve with sand blasting techniques, primarily because of the quality and precision of modern template or stencils that are available.

The above-described methods of image formation are typically manual processes, and are thus labor intensive and slow, if not cumbersome. Manual applicator methods require a significant level of skill by a trained operator. Hand eye coordination is required, and often the work is tiring, repetitive, and at times, boring. Quality control can thus be an issue. Artistic effects and attributes afforded by a well made stencil can be lost by poor or sloppy applicator techniques, particularly when the operator is fatigued or inattentive.

Thus, a computer-controlled, sand blasting system that runs efficiently with simple controls is needed. Furthermore, it is desirable that the applicator head moves in a controlled fashion across a predetermined, horizontal path. Vertical displacements in the apparatus are desirable as well to produce a uniform abrasive flow with predictable, quality results. The abrasive jet flow must not be jerky or intermittent, and carriage or applicator head travel must smooth and not irregular.

A traditional, manual sand blasting arrangement for abrasively cutting or engraving a graveside stone marker is seen in U.S. Pat. No. 1,594,603 issued Aug. 3, 1926. A high pressure sand blast is directed against a stencil placed on a stone item being processed. When abrasive is blasted against the surface, lettering or designs cut through the stencil will expose portions of the stone surface to pressurized abrasive particles, accomplishing the desired ornamentation. This reference discusses different forms of stencils suitable for use in the traditional process.

U.S. Pat. No. 3,267,621 issued Aug. 23, 1966 shows a grit-blasting system for decorating or marking glassware items with selected patterns, lettering or artwork. A semi-automated process employing a typical silk screening machine of the time period moves glassware through the system. High pressure grit aimed at the stenciled regions of the glassware facilitates marking. Various forms and depths of plasticized stencil materials are used.

U.S. Pat. No. 3,516,205 shows an upright, generally cubicle shot blasting or sand blasting apparatus for marking or decorating items within a secure enclosure. Masks or stencils may be employed. The lowermost interior of the enclosure are shaped generally in the form of a truncated, inverted pyramid to assist in withdrawal of spent grit. However, the system is not computerized, using relatively unsophisticated indexing and item transporting.

U.S. Pat. No. 3,916,050 issued Oct. 28, 1975 illustrates the use of blended, polyurethane sheet materials with reinforcing filler for making sandblast stencil sheets. Disclosed work pieces have a layer of pressure-sensitive, adhesive protected by a removable liner on at least one face.

U.S. Pat. No. 4,430,416 issued Feb. 7, 1984 shows another stencil device comprising a transfer element for sandblast carving using a flexible substrate, and an intermediate, resin layer that is strippable from the substrate that provides an adhesive for an etchable material, and a resistance area comprising a photo-cured photosensitive resin.

U.S. Pat. No. 4,801,490 issued Jan. 31, 1989 provides a method and apparatus for sand blasting glass with a stencil providing the desired ornamentation. The stencil comprises a paper sheet having an adhesive on one side and a pattern made from a blast resistant material coated on the other side.

U.S. Pat. No. 5,117,366 issued May 26, 1992 discloses an automated, computer controlled system for carving images onto surfaces of glass, stone, plastic, and metal. The system includes a computer aided design and manufacturing system to control the carving process. The automated system includes a sand blast head which recycles the blast medium and computer software for control of the process.

U.S. Pat. No. 5,132,510 issued Jul. 21, 1992 and U.S. Pat. No. 5,304,773 issued Apr. 19, 1994 disclose automated laser machines that process work pieces with lasers. A work station proximate a support carriage is targeted by a laser head moved by the carriage. The laser head supported by the carriage is movable in X, Y and Z axes.

U.S. Pat. No. 5,568,189 issued Oct. 22, 1996 shows an aerial support platform mechanism with five axes of motion that can support cameras for movie making. An aerial support platform is disposed proximate a pair of parallel cables mounted along respective, opposite walls of a studio. Displaceable carriages ride on various cables.

U.S. Pat. No. 5,854,460 issued Dec. 29, 1998 discloses a gantry assembly for a motor driven laser cutting machine. The machine is controlled by a high performance, multi-axis motion controller.

U.S. Pending Application No. 2001/0025459 published Oct. 4, 2001 discloses metal memorial monument markers and methods of making them. A computer directs a water jet, plasma cutting torch, laser torch or other cutting equipment mounted upon a head disposed over a preprogrammed template.

SUMMARY OF THE INVENTION

This invention provides a computerized system for the automated sand blasting of diverse work pieces. including stone items, particularly graveside markers and monuments. Critical components are housed within an upright, protective enclosure. An elongated actuator assembly horizontally traverses the enclosure interior. The actuator assembly has a pair of parallel, spaced-apart, interior rails forming a horizontal pathway over which a displaceable carriage can move. A high pressure sand blasting head secured to the carriage directs sand towards a target work piece or a group of work pieces to be processed, which are moved along and disposed upon a roller conveyor within the enclosure. The actuator assembly is vertically displaceable so that the sand blasting nozzle may be displaced both horizontally and vertically. Computerized control through a PLC (i.e., programmable logic controller) armed with suitable software, moves the carriage and actuator assembly appropriately during blasting, starting with an indexing step that establishes a travel origin point proximate the work piece surfaces.

Thus a basic object is to mark and decorate or inscribe a variety of items, including stone graveside monuments, through grit blasting or sand blasting techniques.

A related object is to provide an automated and indexed system for marking rigid items such as graveside markers and monuments.

It also an object of my invention to significantly increase the speed of marking and decorating of graveside monuments and markers.

Another important object is to control the inscribing and decorating processing of graveside markers with a computerized system that insures accuracy and improves throughput, reliability and efficiency.

Yet another object is to provide a machine of the character described that has enhanced accuracy and esquires minimal maintenance compared to comparable conventional machines.

A still further object is to provide a system of the character described that does not require a highly skilled operator.

Another important object is to provide an easy-to-use, computerized indexing system for setting up the automated sand blasting heads in a sand blasting machine.

Another basic object is to provide a computerized interface for a system as described above wherein required operator steps for initial process indexing are simplified and automated.

A further object of this invention is to provide a process for abrasively applying designs and marking indicia onto rock, stone, marble, glass or similar rigid structures.

Another object is to avoid the use of hydraulic oil in a system of this nature, which can leak and cause contamination.

Another object is to minimize the setup time for various stone products to be marked and processed.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
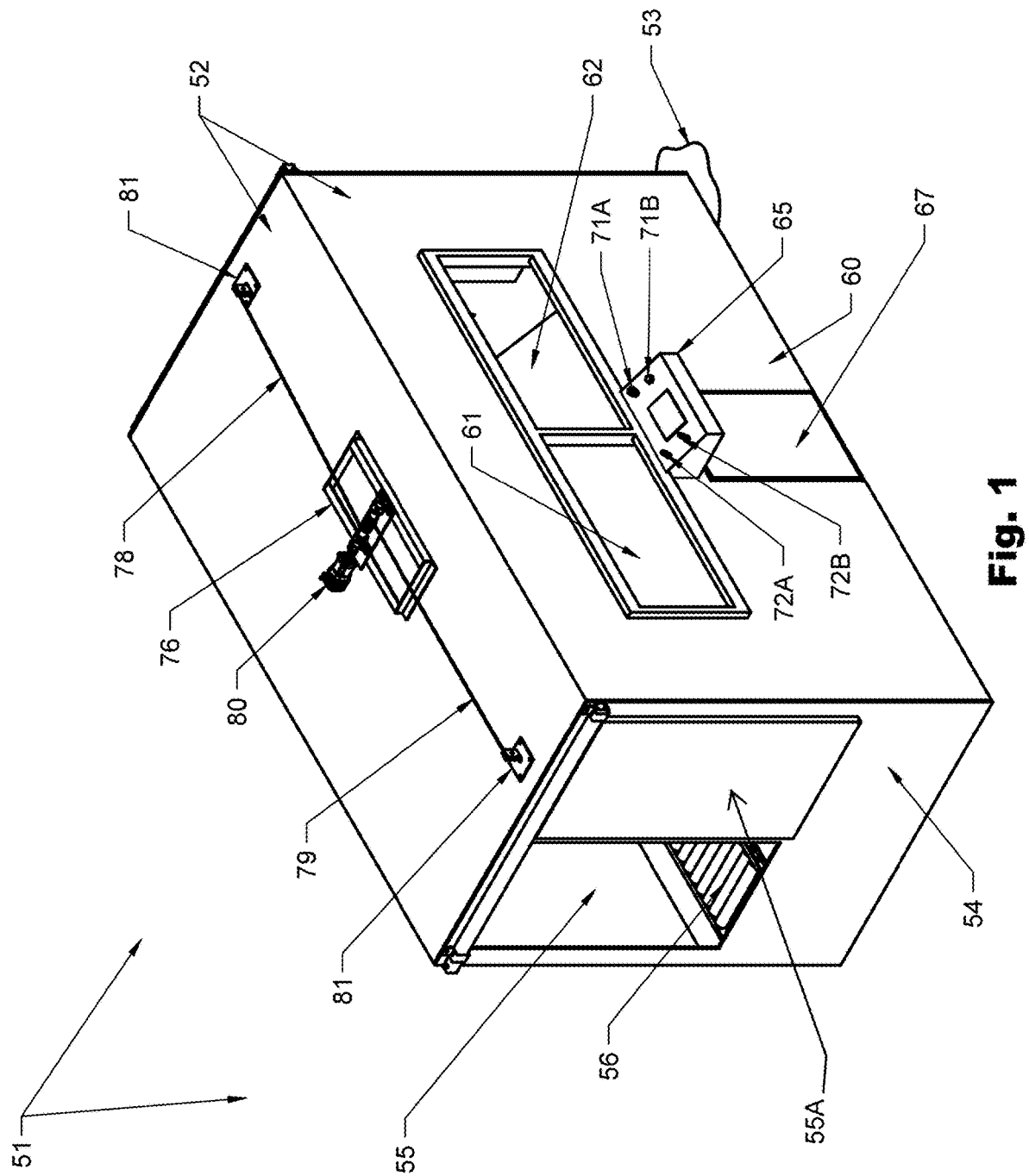
FIG. 1 is an isometric view of my new computer operated sand blasting machine.

Jointly referencing now FIGS. 1-7, the best mode of sand blasting machine constructed in accordance with the teachings of this invention has been generally designated by the reference numeral 51. As used herein the term "sand blasting" generally refers to various forms of grit blasting, wherein high pressure air or gas drives particulate, granular, or abrasive material towards a target.

The preferred machine 51 comprises an upright, substantially rigid cabinet 52, that is generally in the form of a parallelipiped. Cabinet 52, which is disposed on a stable, supporting surface 53 (FIG. 1) houses the various internal mechanisms for processing work pieces 57 (FIG. 2) that can travel through the cabinet interior to be marked and processed. As used herein the term "work piece" refers to grave markers, headstones, tombstones, monuments, or other objects such as glass items, marble objects, mirrors, granite slabs or structures and the like, whether fragile or not, that are to be abrasively marked, lettered or decorated through a masked grit or sand blasting process. The illustrated preferred work piece 57 (i.e., FIGS. 2-4 and 6-7) is in the form of a tombstone or grave marker. The exposed front surface 57A of the work piece (FIG. 2) is to be marked with the blasting process of the invention. It will be covered by a conventional mask during the blasting process.

The left cabinet end 54 (i.e., FIG. 1) has an input opening 55 that can be exposed by opening door 55A. Work pieces 57 to be processed initially enter here and are supported upon a conventional roller conveyor 56 that is horizontally disposed within cabinet 52. Conveyor 56 receives and supports the work pieces 57 for movement through the cabinet interior. The cabinet right end 58 (i.e., FIGS. 2, 4) has an outlet opening 59 that can be exposed by opening door 59A. Processed work pieces may be removed through opening 59 for cleaning and packaging.

Figure 2:
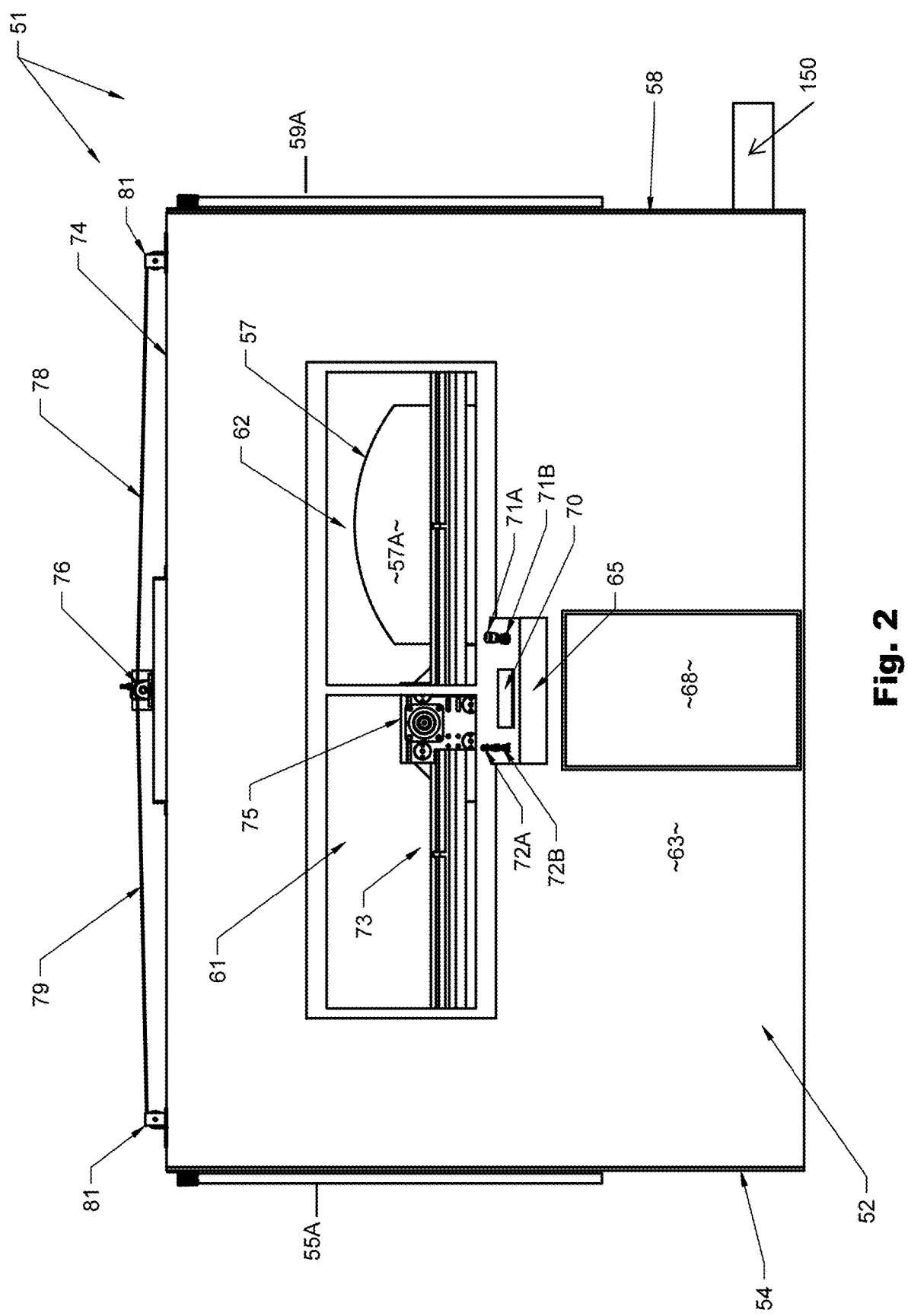
FIG. 2 is a front plan view thereof.
Figure 3:
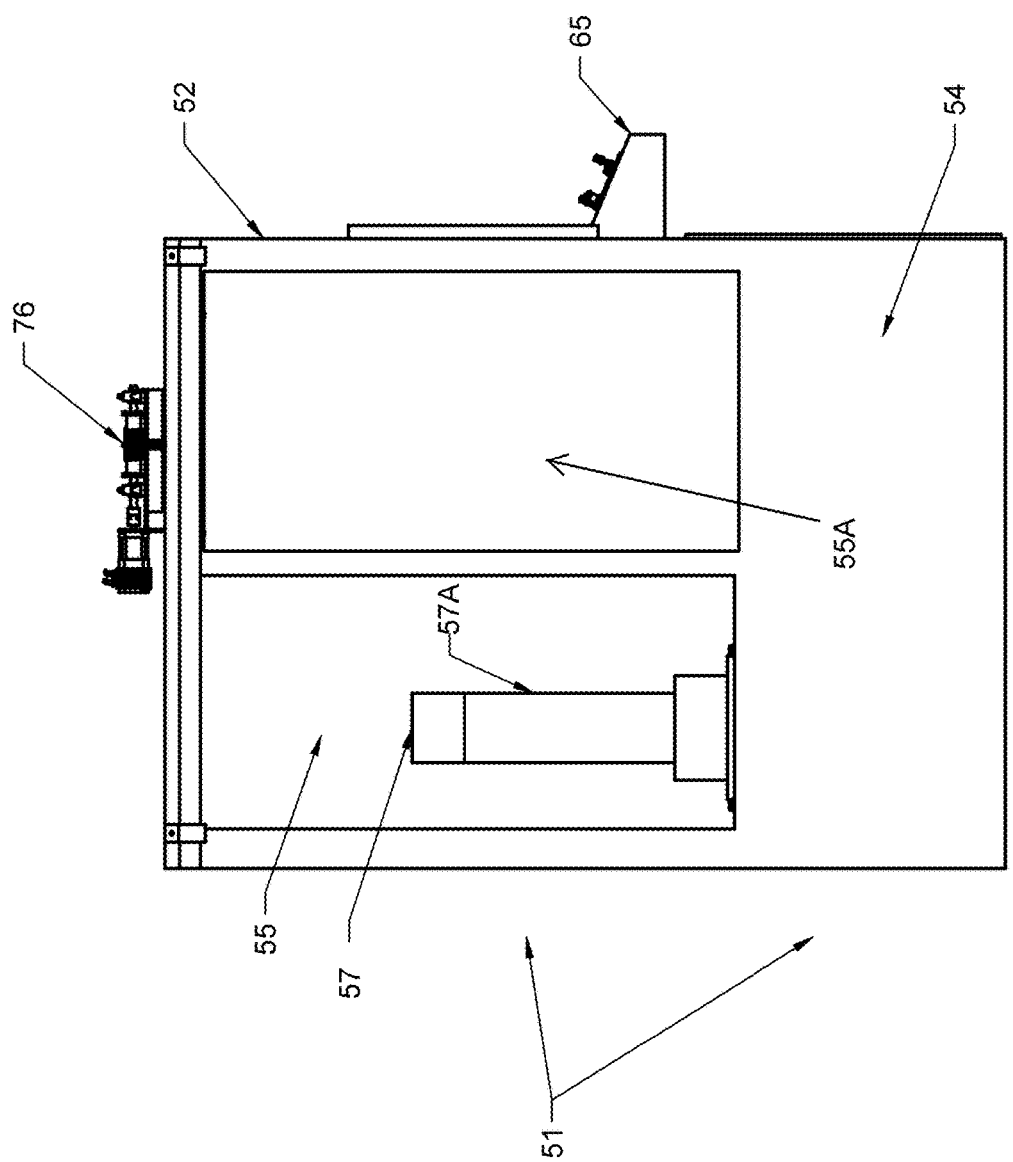
FIG. 3 is a left end elevational view thereof.
Figure 4:
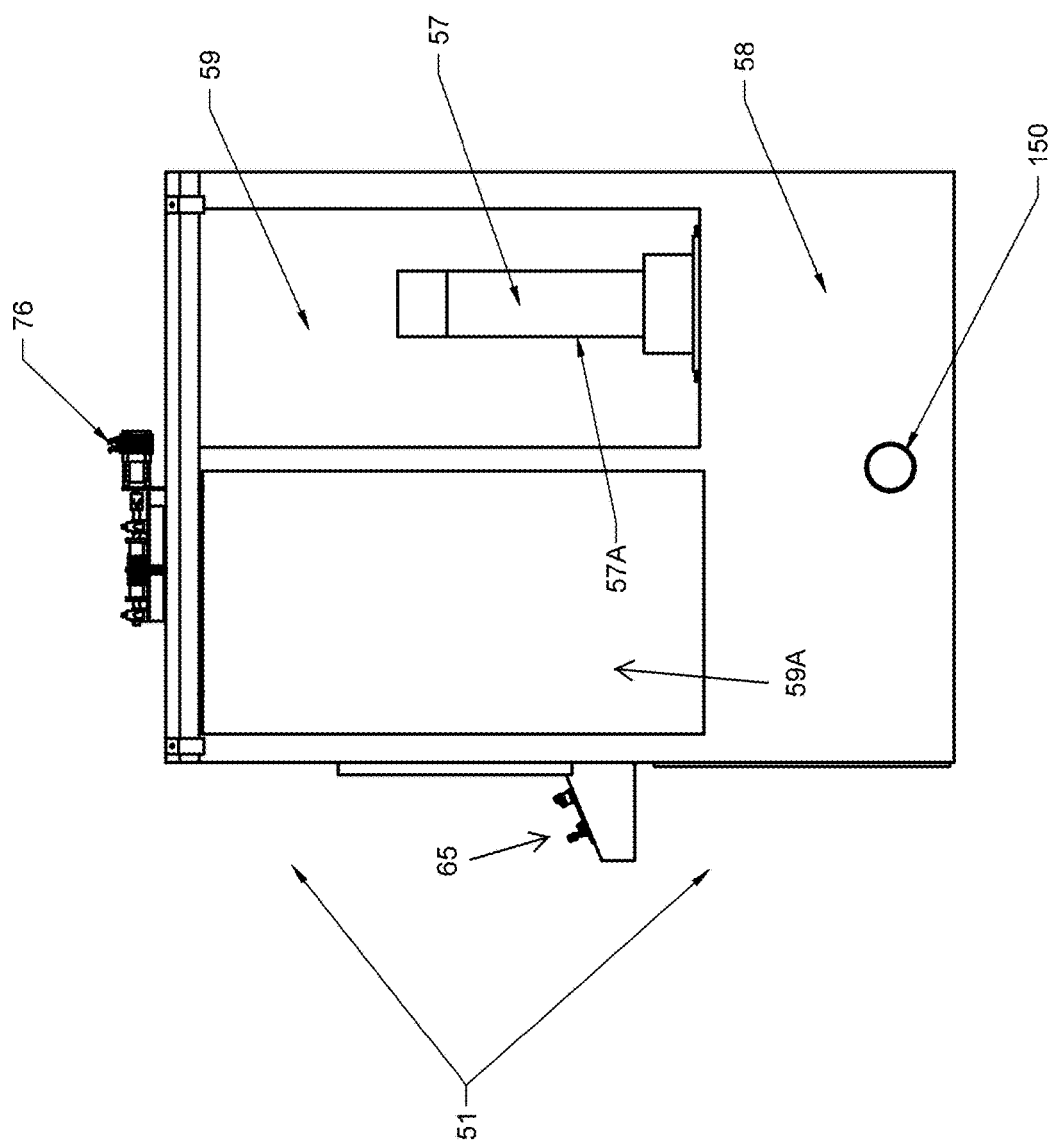
FIG. 4 is a right end elevational view thereof.

The front surface 60 (FIG. 1) of cabinet 52 has a pair of spaced-apart inspection windows 61, 62 defined in the front cabinet surface 63 (FIG. 2) through which an operator may observe the cabinet interior. Below these windows is a human machine interface (i.e., "HMI/PLC") module 65, which is a Unitronics Model SM70-J-T20 that controls servo drive units housed within a lower closet portion 67 to which access is established by door 68 (FIG. 2). The servo drive units are Epsilon Model EP204 units. The preferred PLC software control steps are described hereinafter when referencing FIGS. 19-28 discussed later.

Figure 16:
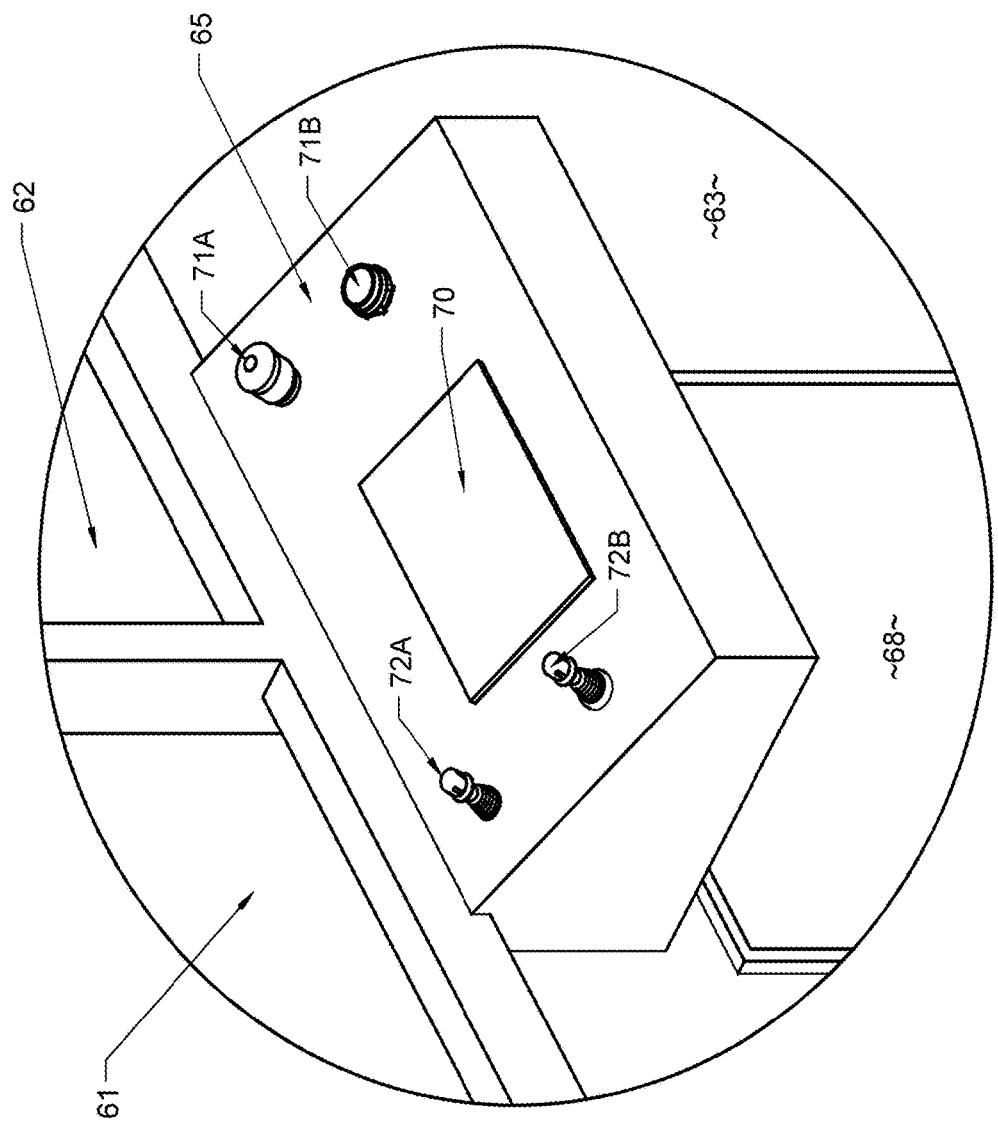
FIG. 16 is an enlarged, fragmentary isometric view of the control console.

The HMI/PLC module 65 has a touch-screen, LCD display 70 (i.e., FIG. 16) visible by an operator, which displays various patterns and menus machine operation, such as those illustrated in FIGS. 23-27. The display module 65 has a pair of joysticks 72A and 72B for inputting process control commands, along with side-mounted, power on and off switches 71A and 71B.

An elongated actuator assembly 73, visible through the windows 61, 62 in the machine front 60 (i.e., FIG. 2) moves a carriage 75 mounting a sand or grit blasting nozzle relative to the work piece 57 to be processed. The actuator assembly 73 (i.e., FIGS. 6, 7) horizontally extends across the cabinet interior, extending generally between the left and right cabinet ends 54, 58 respectively. The abrasive sand blasting jet head 215 (FIGS. 11 and 12) is secured to carriage 75 that moves along the actuator assembly 73 as explained hereinafter. Importantly, an elevator assembly 76 mounted atop cabinet 52 controls a pair of lift cables 78, 79 entrained over a rotating spindle assembly 80 (FIGS. 1, 5) for lifting or lowering the actuator assembly 73 within the cabinet. Combinations of horizontal carriage movements linearly along actuator assembly 73, and vertical displacements of the actuator assembly implemented by the lift cables 78, 79, move the spray head 215, which is directed towards a masked target. Cables 78, 79 are wound over spaced apart idler pulleys 81 on top of the cabinet so that they drop vertically below into the cabinet near the cabinet ends.

Figure 9:
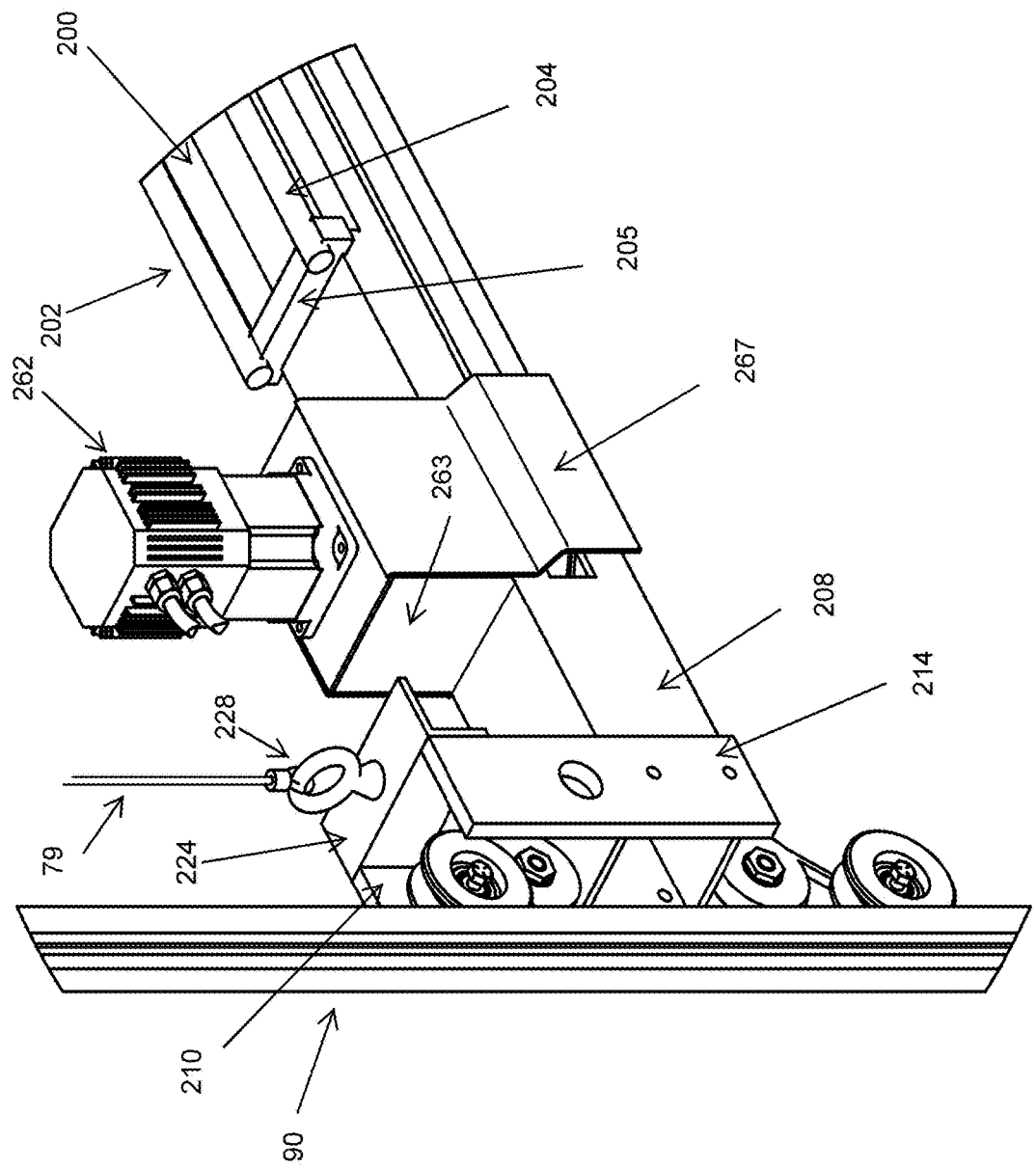
FIG. 9 is an enlarged, fragmentary isometric view of the preferred belt drive module derived from the circled region labeled "FIG. 9" in FIG. 8.
Figure 10:
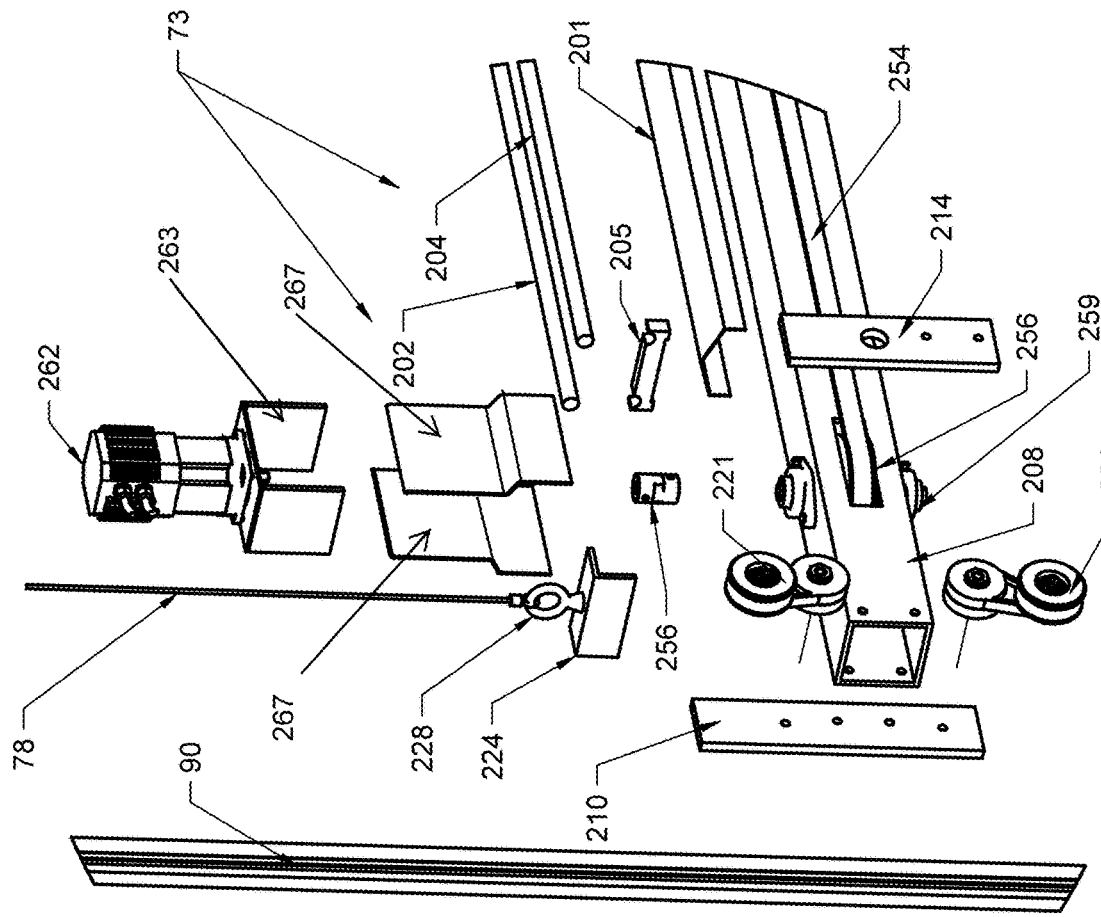
FIG. 10 is an exploded, fragmentary isometric view of the preferred belt drive module of FIG. 9.

With primary reference directed now to FIGS. 6-12, the actuator assembly 73 moves the sand blasting carriage 75 up and down or sideways within the cabinet to properly aim the blasting jet head 215 (FIGS. 7, 11, 12) towards a work piece 57 sitting on the internal conveyor 56 (FIG. 1) within the cabinet 52. The actuator assembly 73 comprises a substantially rigid, elongated track 200 (FIGS. 9, 11, 13) comprising a pair of elongated, rigid rails 202 and 204 (FIGS. 9, 10) that are suspended atop an elongated cover 201 (FIG. 10) by spaced apart end brackets 205 (FIGS. 9, 10, 14) mounted atop the track frame 208. The rigid, square tubing track frame 208 supports a similar pair of rectangular braces 210 and 214 at its opposite ends (FIGS. 9, 10, 13). Each brace 210, 214 comprises several mounting orifices for suitable fasteners enabling attachment of the braces to opposite ends of the track frame 208. An angled lift bracket 224 extends between braces 210 and 214 at their tops (i.e., FIGS. 9, 10, 13). Each bracket 224 supports an eyelet 228 that is coupled to an elevation control cable 78 or 79 described earlier that vertically displaces the actuator assembly 73 upwardly or downwardly within the cabinet.

The ends of the actuator assembly are each buffered or made shock resistant via upper buffer wheel assemblies 221 and lower buffer wheel assemblies 222. These upper and lower buffer wheel assemblies 221, 222 fit between the braces 210, 214 at each end of the actuator assembly. Suitable buffer wheel assemblies comprise Fenner, model FS0127. Each wheel assembly comprises a spring loaded radial tensioner. Each buffer wheel assembly comprises a larger diameter wheel portion that is spring biased towards a rigid, vertically oriented guide rail 90 vertically supported internally of the cabinet on opposite interior ends (i.e., FIGS. 9, 10, 13, 14). As best seen in FIG. 13, each guide rail 90 comprises an extrusion of somewhat inverted V-shaped profile, with the raised apex 91 from each rail 90 bounded by opposite edges of buffer wheels 221, 222 that project towards rails 90. Tracking contact between the buffer wheel assemblies 221 and 222 and the guide apexes 91 resists torsional displacements of the actuator assembly 73. The actuator assembly 73 can thus move upwardly and/or downwardly, and twisting and jamming is avoided. The buffer wheel assemblies 221, 222 further dissipate and attenuate shocks encountered by excessive lateral displacements of the actuator assembly 73 to promote stability.

Carriage 75 (FIGS. 11 and 12) comprises a box-like, generally cubicle enclosure with open ends. It's purpose is to transport the sandblasting applicator head 215 that is driven through blast input pipe 216 from a conventional hose. As the blast nozzle apparatus is moved by the carriage during processing, the items being treated will be vigorously blasted by the high pressure grit outputted from nozzle head 215 (FIGS. 11 and 12).

Figure 11:
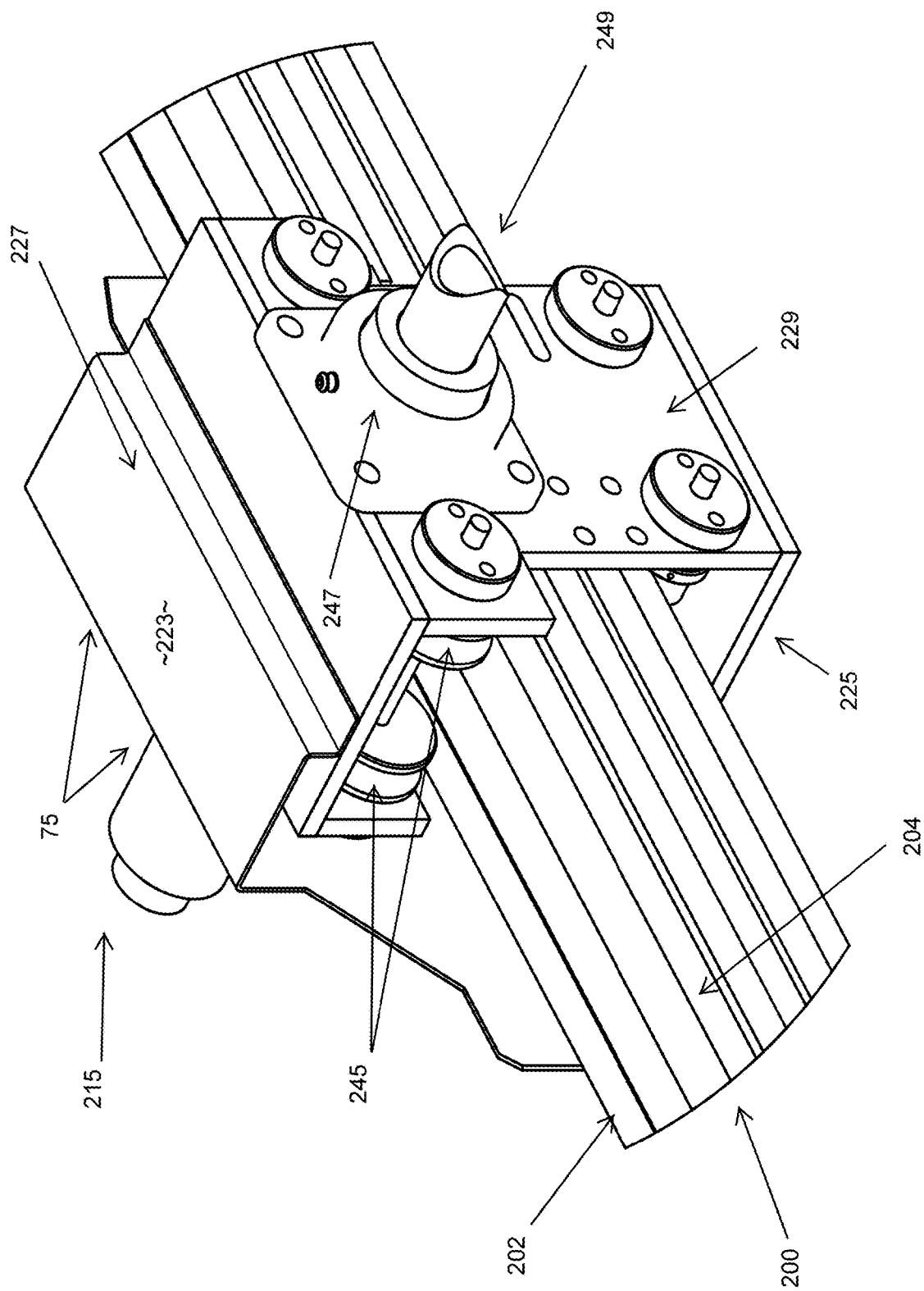
FIG. 11 is a fragmentary isometric view of the preferred carriage assembly derived from the circled region labeled "FIG. 11" in FIG. 8.
Figure 12:
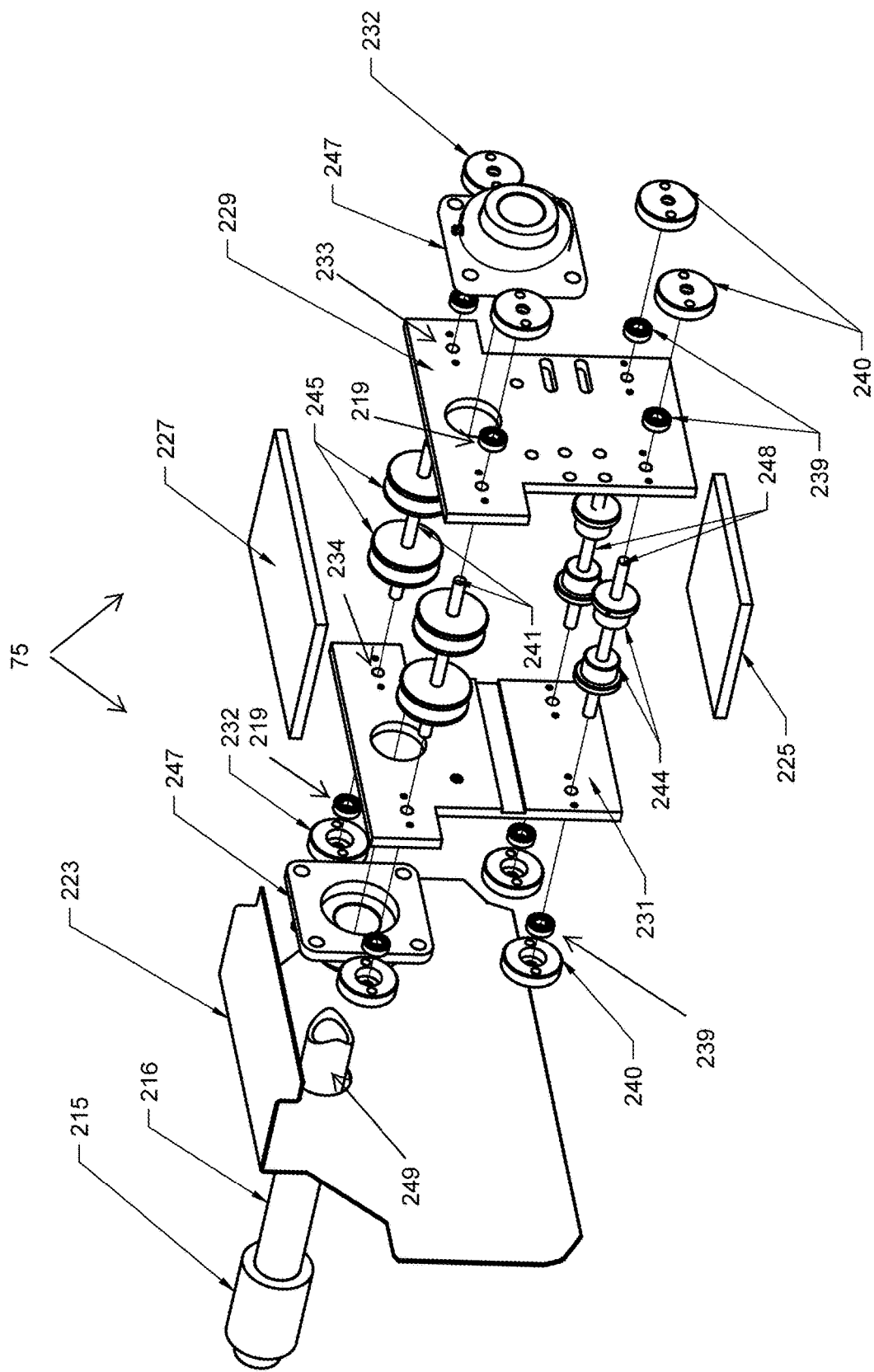
FIG. 12 is an exploded, fragmentary isometric assembly view showing the preferred carriage assembly of FIG. 11.
Figure 13:
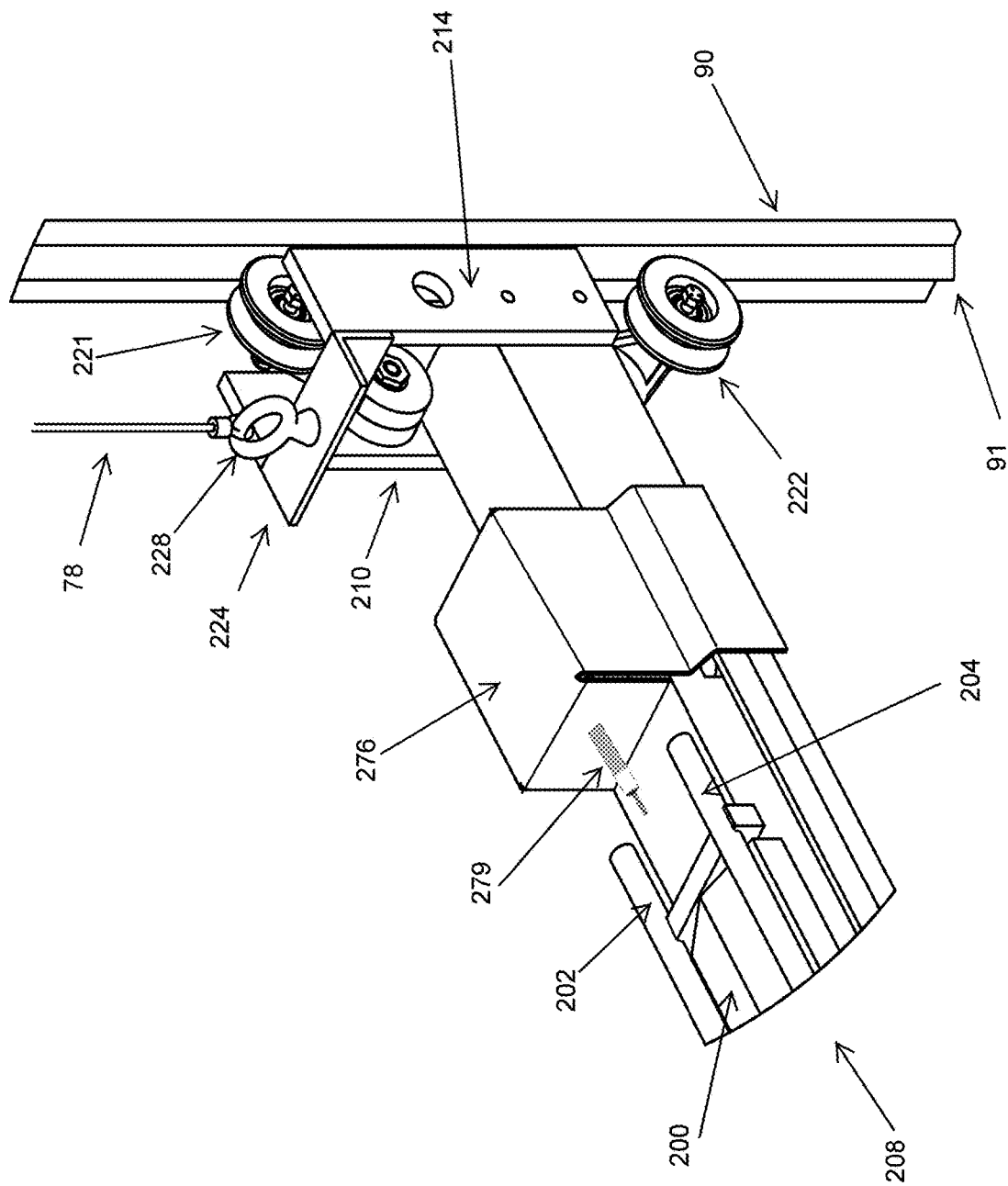
FIG. 13 is an enlarged, fragmentary isometric view of the preferred belt idler module derived from the circled region labeled "FIG. 13" in FIG. 8.

With primary reference directed to FIGS. 11 and 12, the carriage 75 is slidably mounted to the track 200 upon upper rails 202 and 204. The carriage comprises a pair of rigid, spaced apart, side plates 229, 231 between which twin pairs of upper suspension wheels 245 extend. These wheels 245 ride on rails 202, 204 (FIG. 11). Axles 241 (FIG. 12) extend through suitable registered orifices 233, 234 in aligned side plates 229, and 231 and terminate through bushings 219 proximate external bearings 232. Two pairs of lower, stability wheels 244 ride below in contact with the track 200. Twin lower transverse axles 248 that penetrate suitable orifices in frame plates 231 and are secured by terminal bearings 240 through bushings 239. These lower stability wheels 244 (FIGS. 11 and 12) limit sudden or irregular upward carriage movements by riding along the bottom of the actuator assembly 73. The carriage is bounded at its top and bottom by plates 227 and 225 (FIG. 12). A somewhat trapezoidal rear side shroud 223 substantially blocks reflected sand or grit from entering the carriage 75. Each side plate 229, 231 supports a through bushing 247 for the high pressure jet hose 249 that supplies jet 215 (FIG. 12) via pipe 216.

Horizontal carriage propulsion is established by an elongated, endless belt 254 (FIG. 10) forming a loop that is entrained over spaced apart pulleys 256 (FIGS. 9 and 10) and 257 (FIGS. 13 and 14) to horizontally displace the carriage 75 relative to the actuator assembly 73. A viable open ended belt is provided by Gates, part number L100. Cogs on the belt are spaced 0.375 inches on center and the belt is 1.0 inch wide with no specified length. It is cut as needed per machine.

A drive pulley 256 (FIGS. 9 and 10) is operated by a precision servo motor 262 splined to collet 256 that engages the pulley driveshaft through pillow blocks 259. The servo motor may comprise Control Techniques model 067EDB300BACRA. The servo motor 262 is shrouded by a pair of lower, parallel base plates 263 and spaced apart side plates 267. The belt 254 is oriented within the track frame 208 such that the plane of the belt at each side is vertical, i.e., the plane of the belt is disposed perpendicularly to ground.

Figure 14:
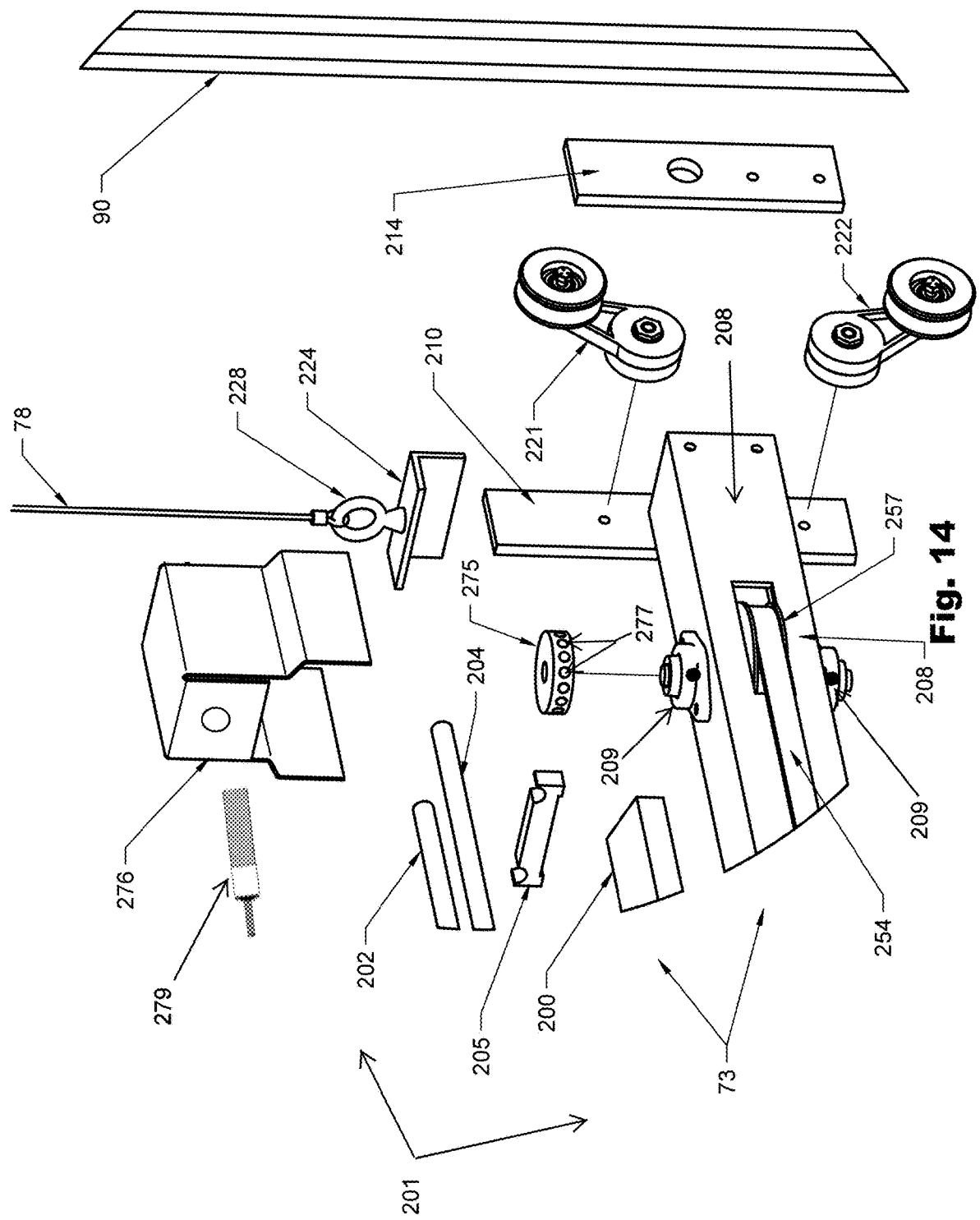
FIG. 14 is an exploded, fragmentary isometric view showing the preferred belt idler module of FIG. 13.

As seen in FIG. 14, a spaced-apart, companion belt idler pulley 257 is captivated for rotation between a pair of spaced-apart pillow blocks 209, and a driveshaft (not shown) couples the pulley to idle-wheel sender 275, which may comprise an Electro Sensor Co. part number EZ906 Pulser disk. The idler pulley area is shrouded by a cover 276 (FIGS. 13, 14). Belt jamming can be sensed by monitoring idle pulley rotation. Sender 275 comprises a plurality of radially spaced-apart magnets 277 about its periphery arranged with poles alternating between "North" and "South" orientations. When the sender 275 rotates, a nearby sensor 279 (FIG. 14) generates electric pulses in response to magnets used by the software described hereinafter. Sensor 279 is mounted interiorly of cover 276 such that it will be positioned proximate sender 275 in assembly. Preferably sensor 279 comprises a Hall effect sensor, and Electric Sensor company model EZ906 is appropriate. Alternatively conventional magnetic pick-up coils could be substituted for the latter.

Figure 15:
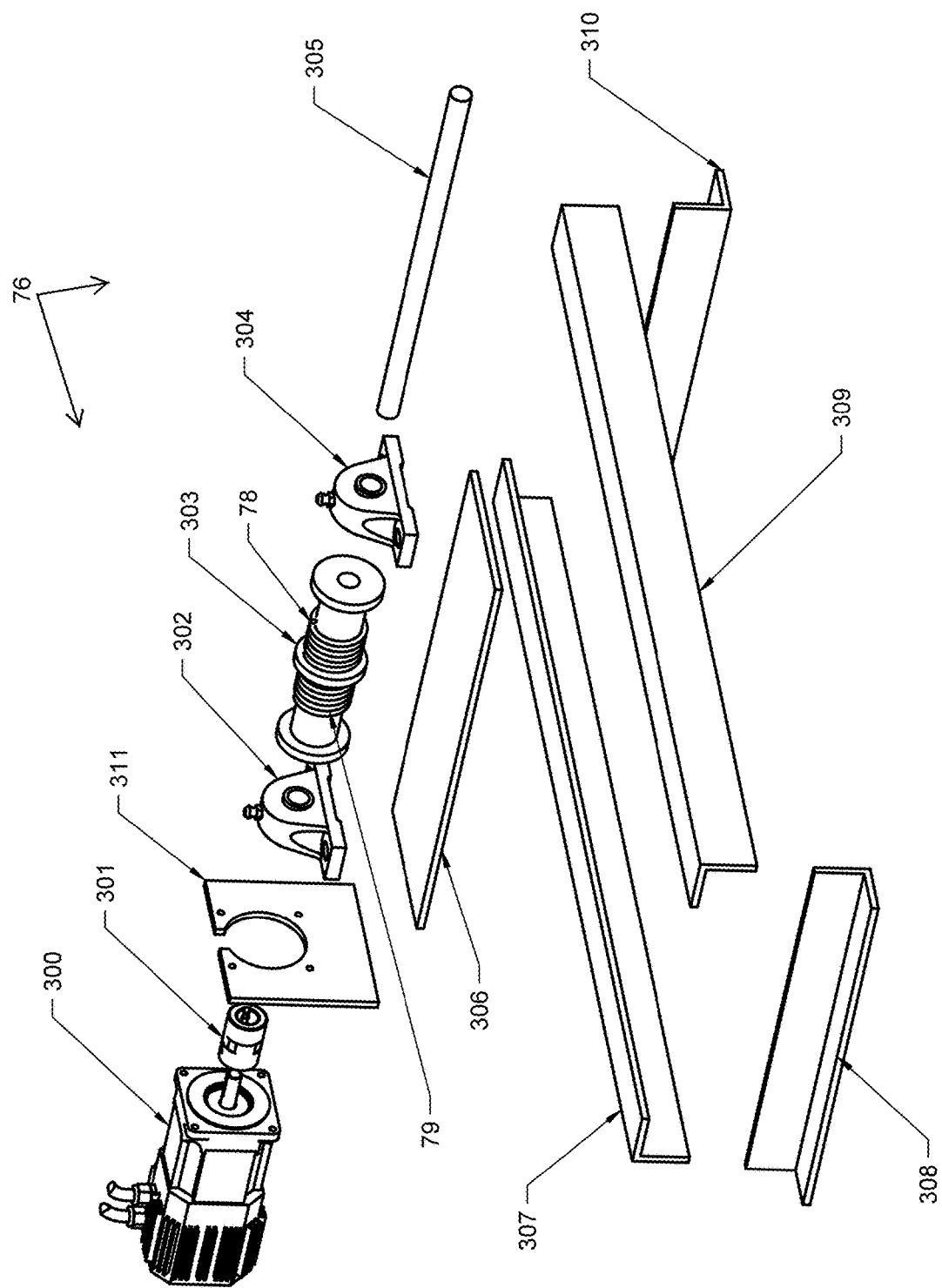
FIG. 15 is a fragmentary, exploded isometric view of the preferred elevator assembly for vertical control of the actuator assembly.

FIG. 15 details the elevator apparatus 76 that causes controlled, vertical displacements of the actuator assembly 73. An elevator motor 300, which is identical to the horizontal drive motor described earlier as used in the actuator assembly 73, drives a collet 301 connecting to a suitable driveshaft 305 splined to a twin-section spindle 303. A pair of pillow blocks 302, 304 rotatably mount and support the shaft 305. The motor 300 is secured with suitable fasteners to a rigid mounting plate 311 that is secured to a lower base comprising a pair of side rails 307 and 309 that are welded to end trusses 308 and 310. The frame and the elevator apparatus are secured atop the cabinet 51 as described earlier (i.e., FIG. 5). Portions of the previously described elevator lift cables 78 and 79 are seen wound about opposite sections of the spindle 303, whose rotation winds or unwinds them concurrently to raise or lower the actuator assembly 73 within the cabinet.

Figure 5:
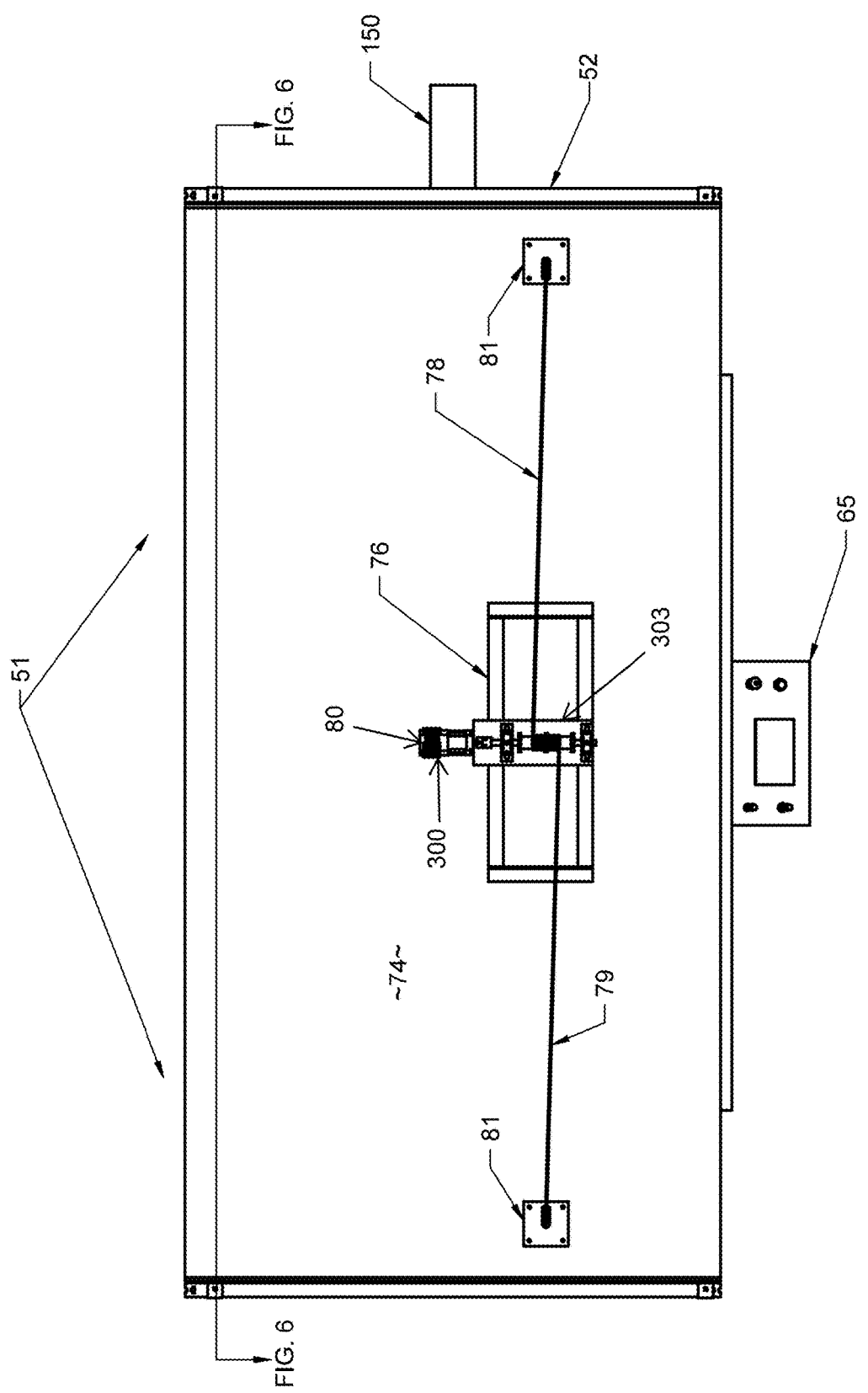
FIG. 5 is a top plan view thereof.
Figure 6:
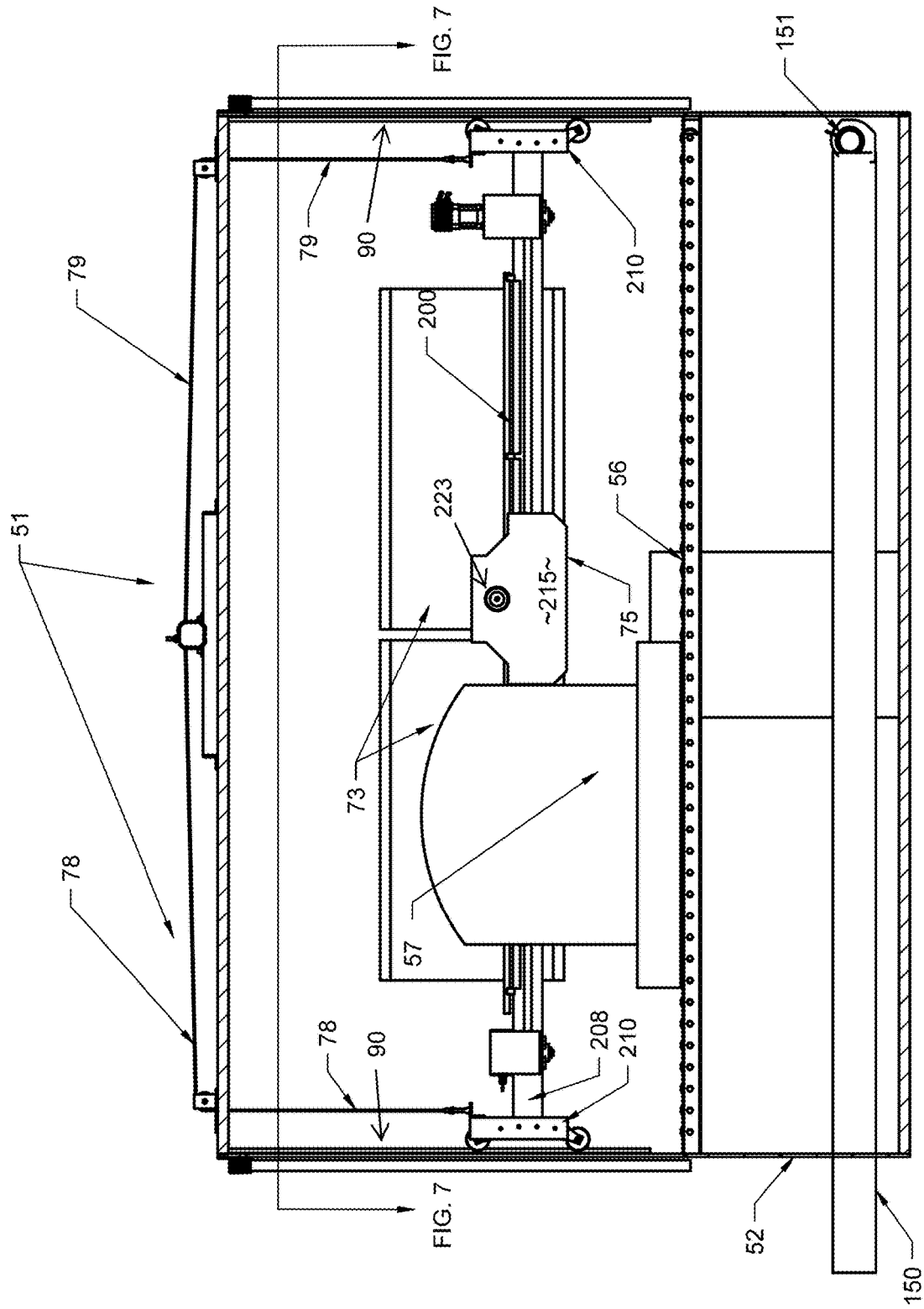
FIG. 6 is a rear, longitudinal sectional view taken generally along line 6-6 of FIG. 5.
Figure 7:
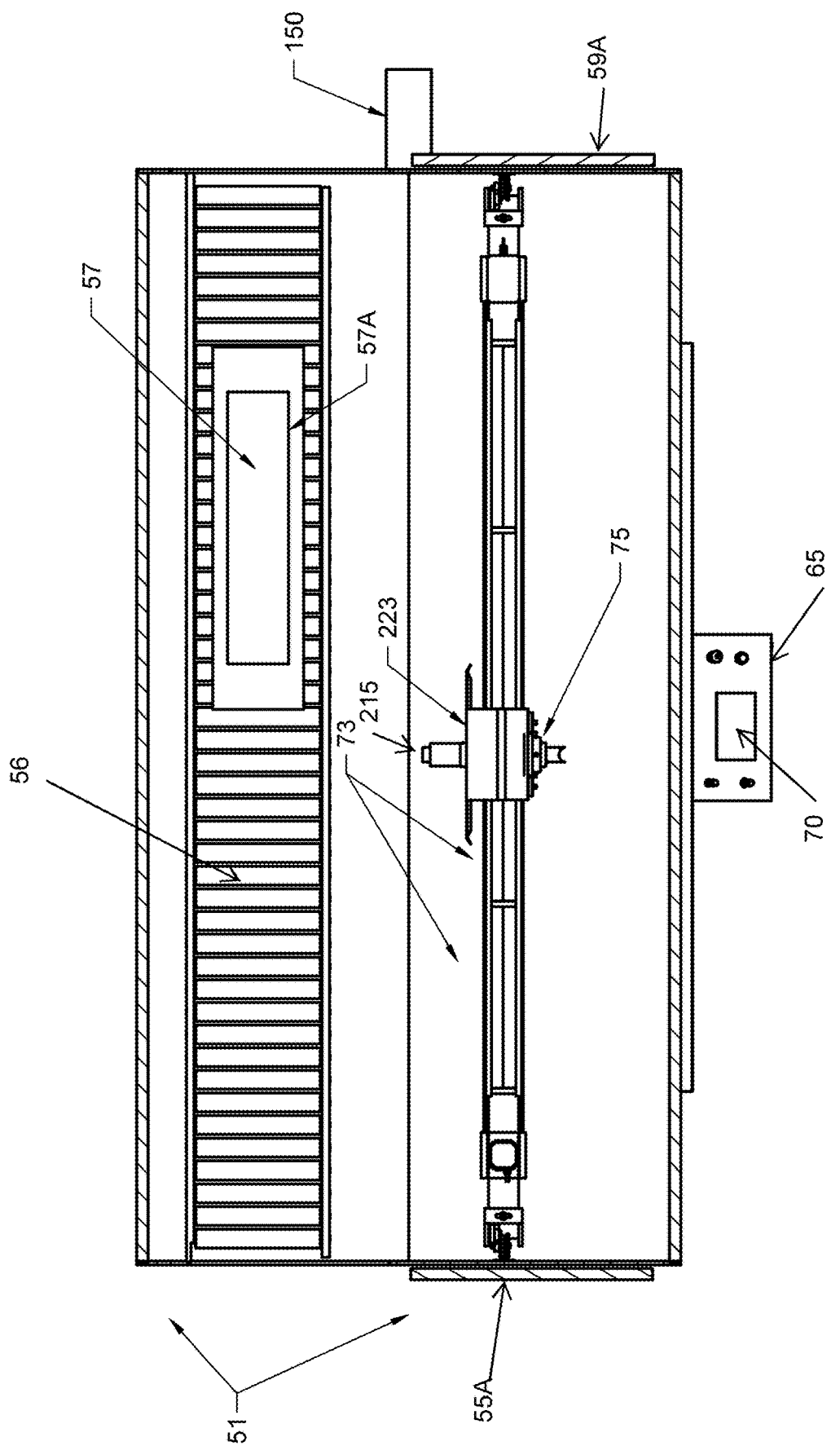
FIG. 7 is a vertical sectional view taken generally along line 7-7 of FIG. 6.
Figure 8:
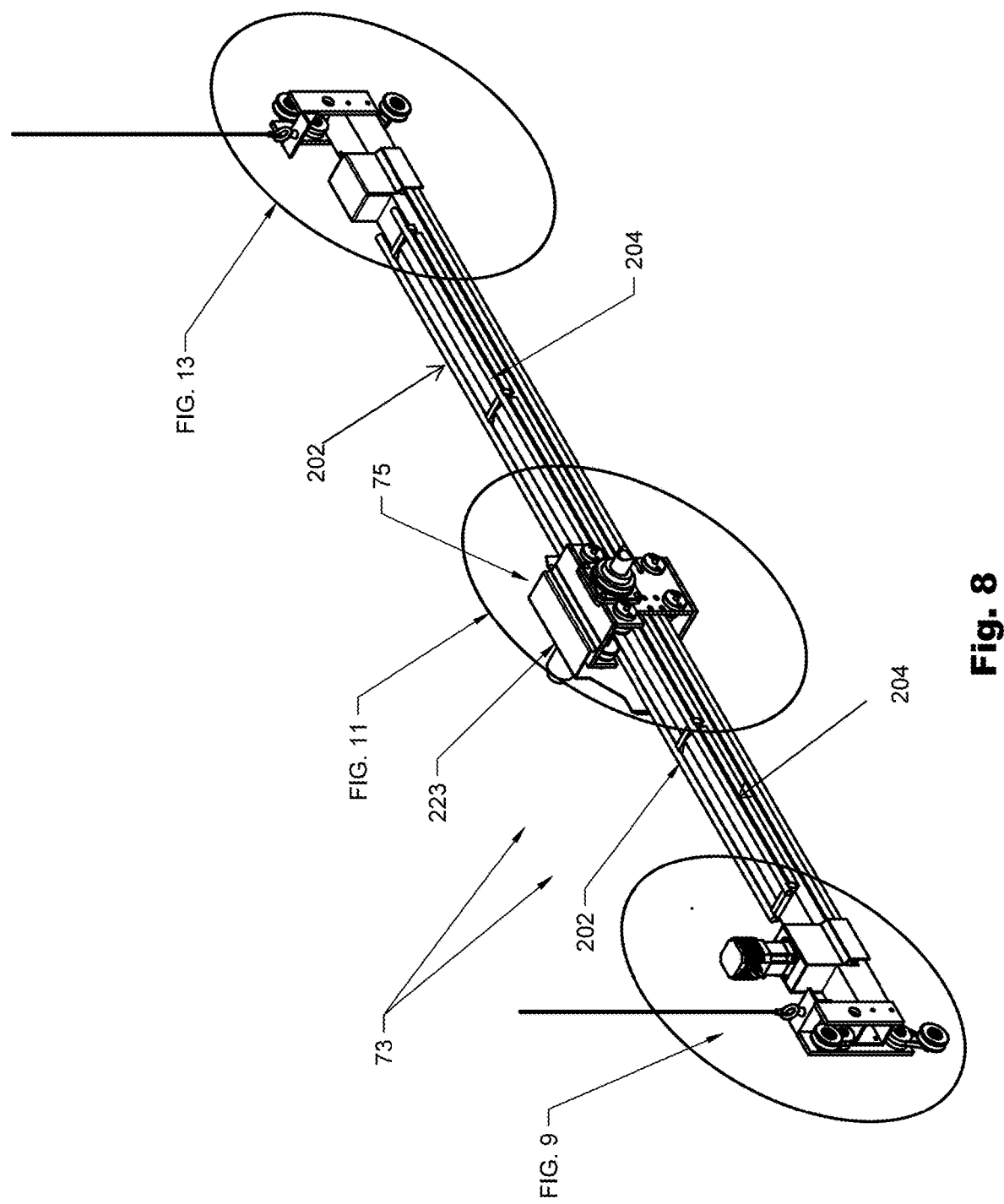
FIG. 8 is an enlarged, fragmentary isometric view of the preferred actuator assembly.
Figure 17:
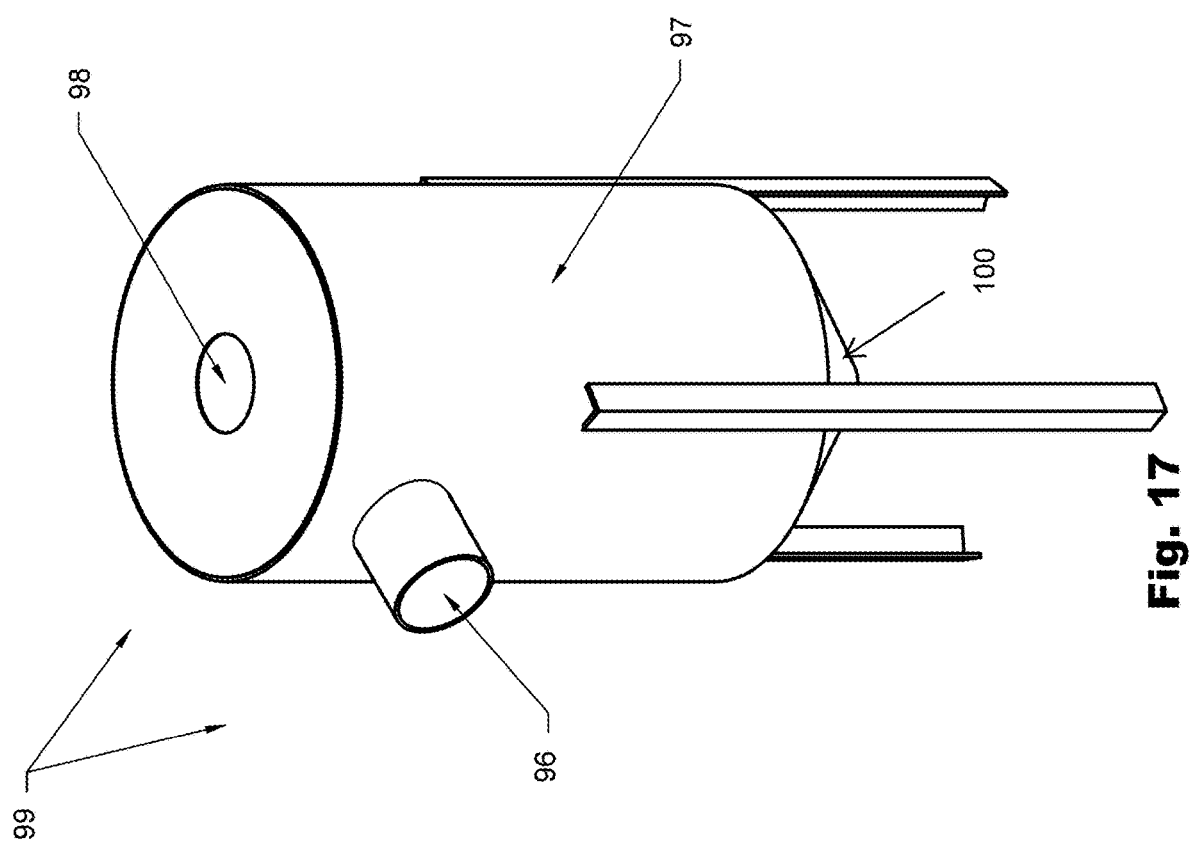
FIG. 17 is an isometric view of the preferred sand hopper where recovered blast media is stored during operation.
Figure 18:
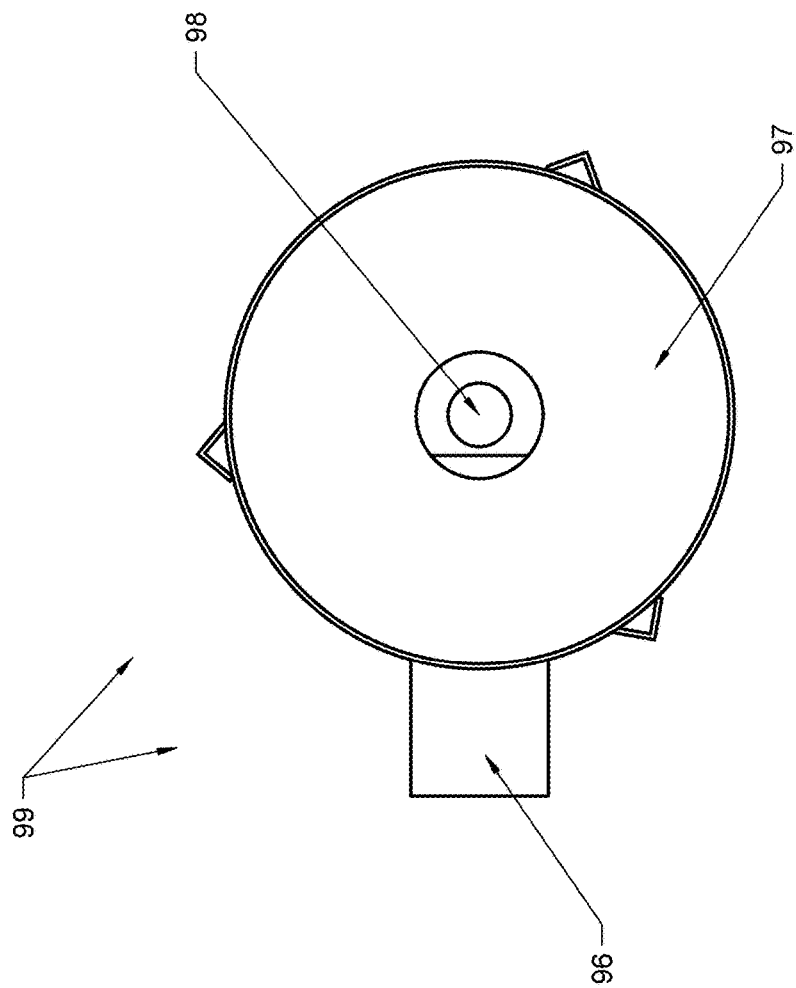
FIG. 18 is the a top plan view of the recovery hopper.

FIGS. 17 and 18 show the preferred external sand hopper 99, in which recovered blast media is stored until next use. The main body 97 is an upright, generally cylindrical steel tank comprising an input 96 and a vent 98. Output occurs at the conical bottom 100 (FIG. 17). As recognized by those with skill in the art, hopper 99 sits atop a sandblast pot, comprising an EMPIRE model 650 blast pot available in the open market. The input 96 receives recovered blast media carried from the bottom output 150 (FIG. 4) of the blast cabinet, through PVC piping 150 (FIGS. 5 and 7). The method of transfer is accomplished by a radial blower motor 151 (FIG. 6). The preferred six inch PVC pipe structure 150 is routed to hopper input 96. The hopper output orifice 98 on top (FIG. 17) enables connection of a conventional dust collection system to remove light dust particles from the mix of blast media. This also removes excess air within the closed system, and facilitates the grit recovery process.

Figure 19:
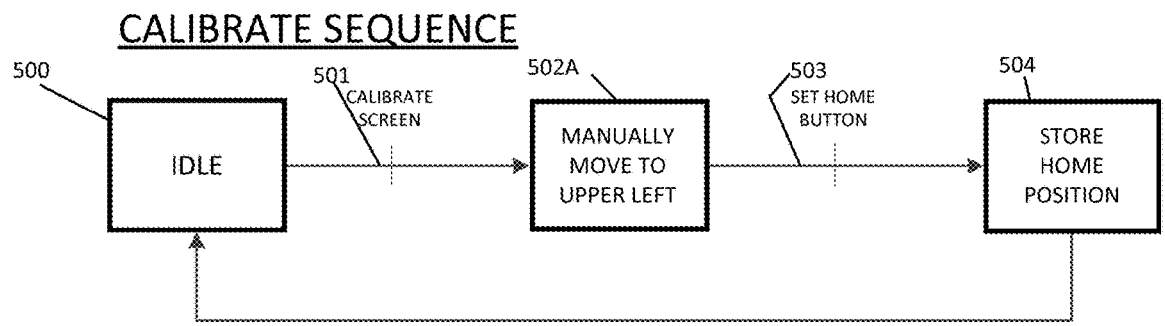
FIG. 19 is a software flow chart of the preferred calibrate sequence.

The flow charts of FIGS. 19-22 illustrate the preferred software. Many of the functions relate directly to touch screen commands displayed and implemented by the LCD screen 70 (i.e., FIG. 16). FIG. 19 shows a "calibrate sequence" in which an idle process 500 at the start is followed by a "calibrate screen" warning 501, which is accomplished by the user pressing button 609 of menu 600 (FIG. 23). This will display the "manual entry screen" 620 (FIG. 25) on the LCD display for the operator.

In step 502A the operator moves the sand blasting head to the upper left of the target area to be blasted. The "set-home" button is pressed at 503 thereafter. The home position is set at 504. The process returns to step 500. The calibrate sequence must be performed each time the machine is powered up, typically the first part of the day. After power is first applied, the machine is in an idle state awaiting manual inputs.

Figure 25:
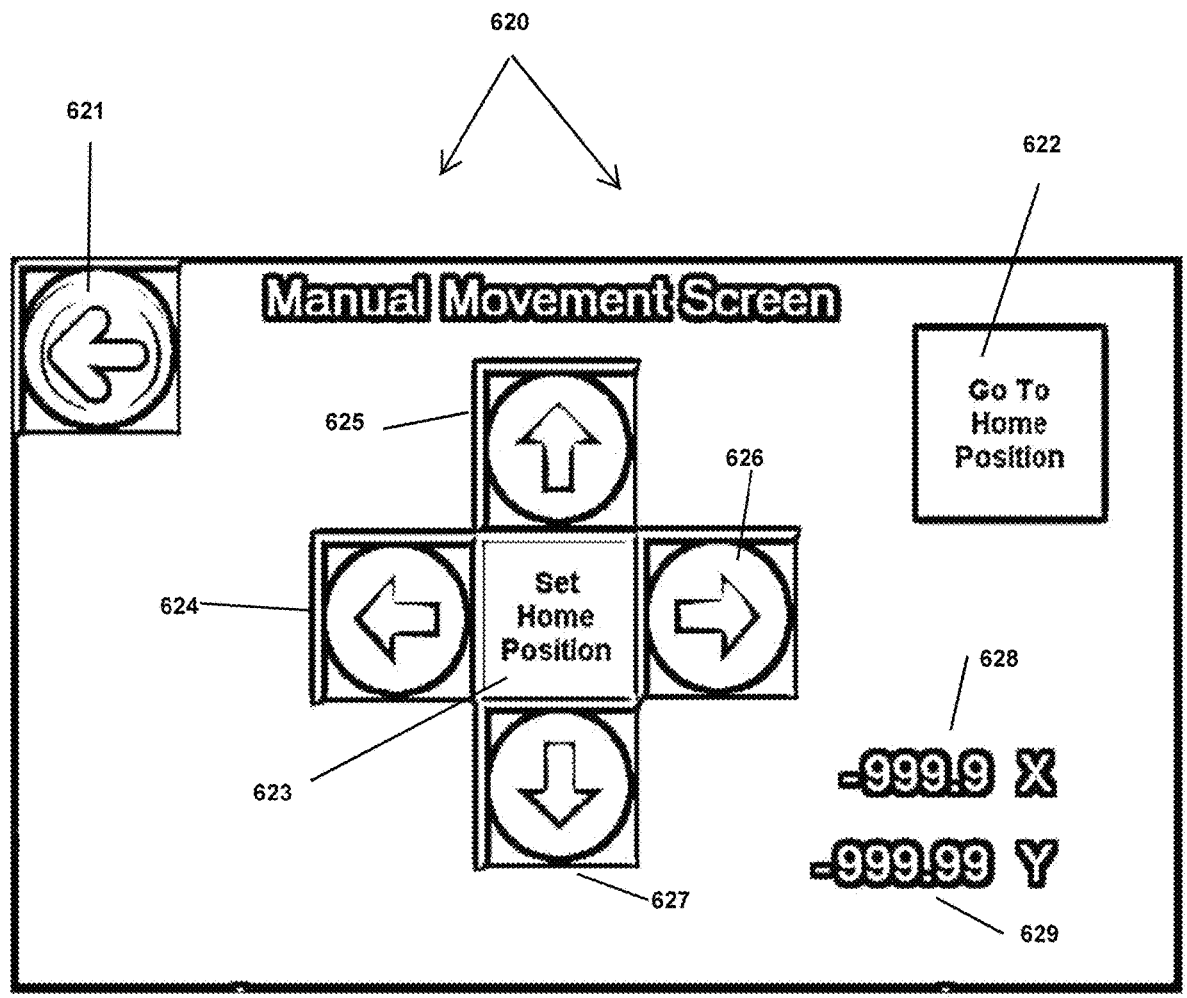
FIG. 25 is a diagrammatic view of the HMI/PLC manual movement screen used to manually manipulate the position of the carriage and blast head.

To implement step 502A of the "calibrate sequence" (FIG. 19), an operator will view the "Manual Movement Screen" of FIG. 25. Through this menu, an operator may select the movement keys on the LCD touch screen 70 (FIG. 16) or the joysticks 72A or 72B (FIG. 16) to move the actuator assembly 73 and the blast head 215 (FIGS. 11 and 12) to the upper left as desired. Then the "set home position" button 503 on the touch screen (FIG. 16) will store an initial coordinate (indexed as "0,0") for both the X and Y axis for a home position or start for every pattern referenced from this point on.

Figure 26:
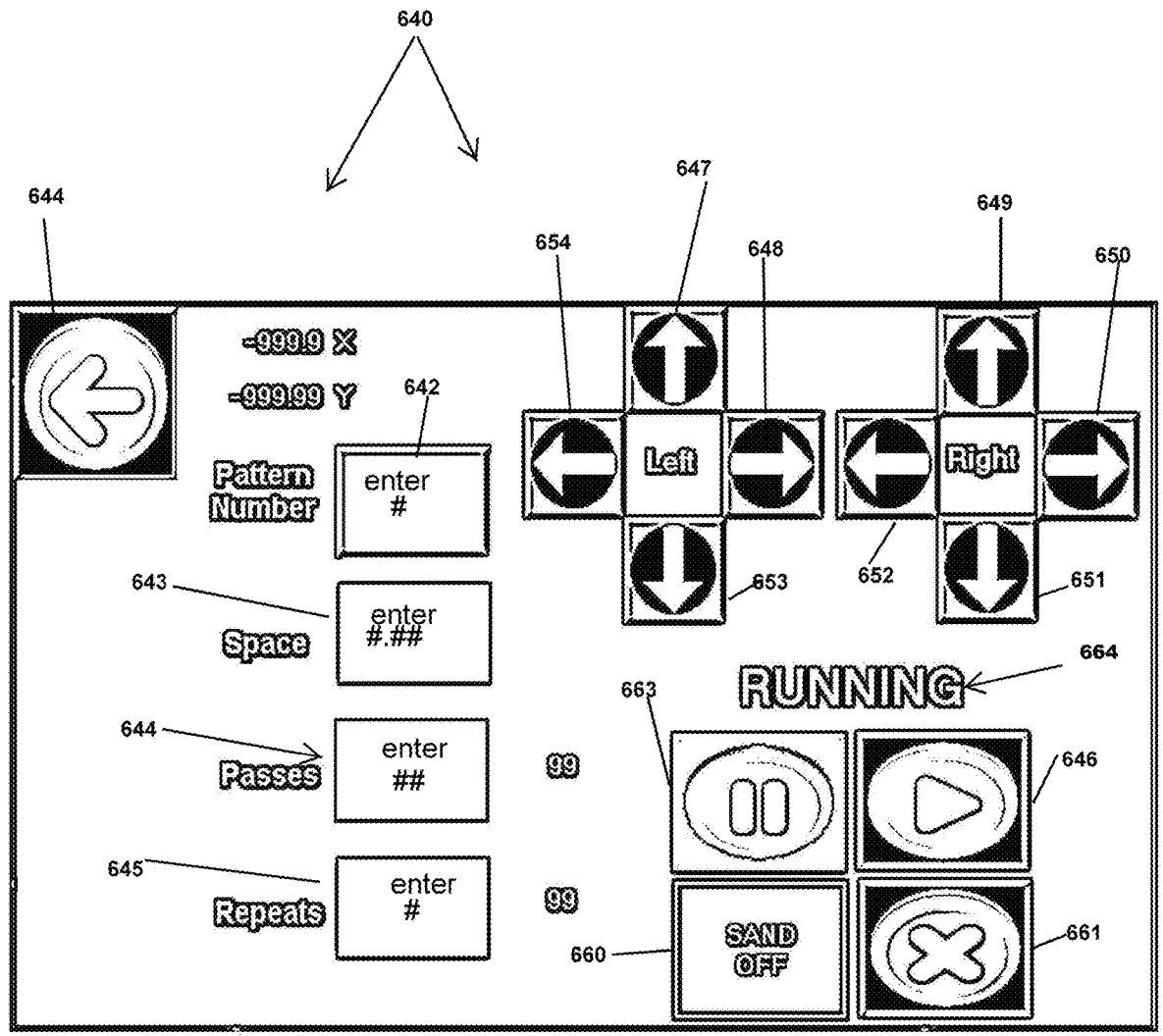
FIG. 26 is a diagrammatic view of an HMI/PLC "running" screen.
Figure 27:
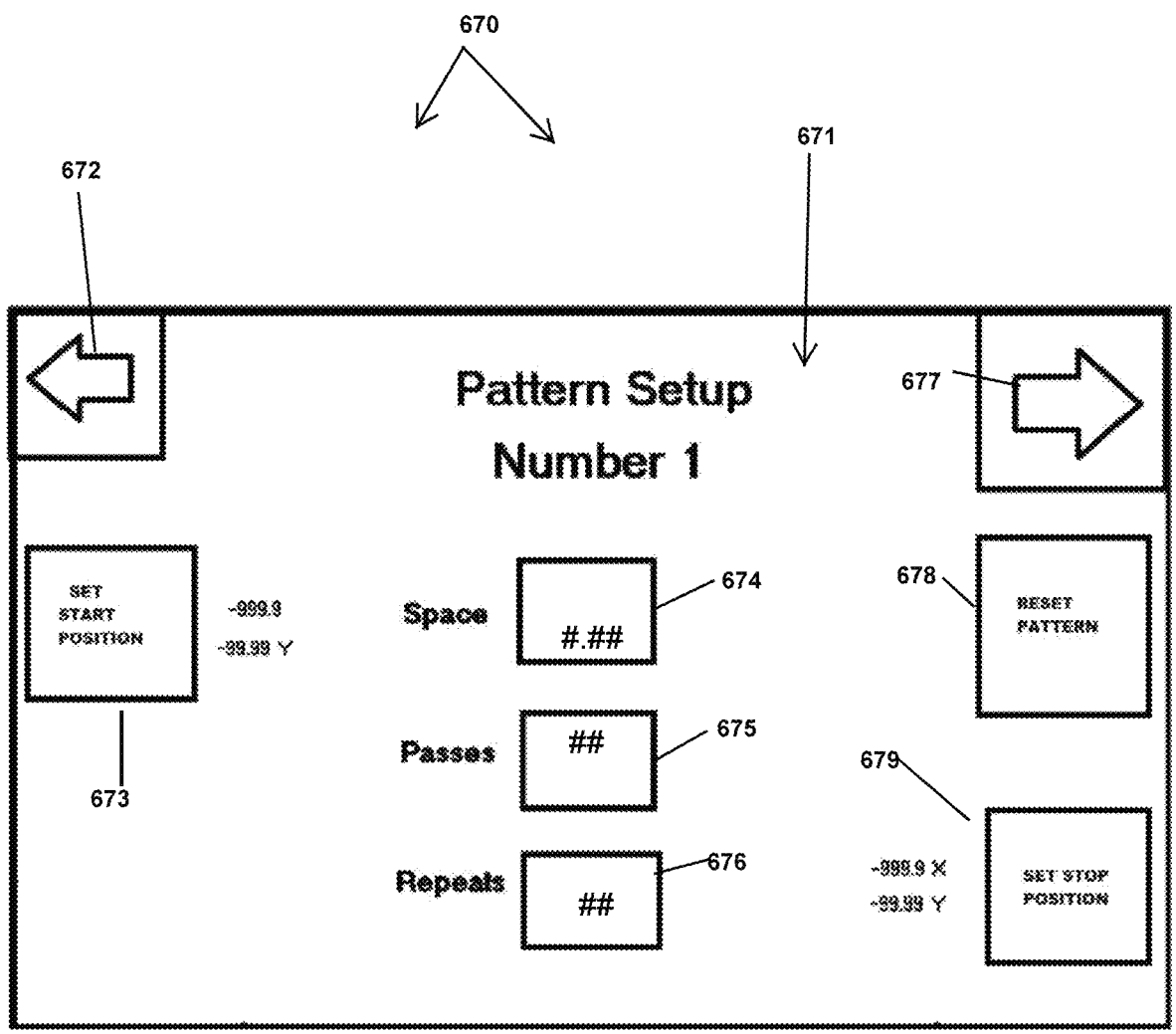
FIG. 27 is a diagrammatic view of an HMI/PLC pattern setup screen.

The operator will set up a pattern for each stone they wish to blast. From an idle state, (i.e., item 500, FIG. 20) the operator selects a pattern setup screen, such as the one illustrated in FIG. 27, using button 610 on the initial menu screen 600 (FIG. 23). Utilizing the joysticks 72A, or 72B described previously, the operator moves the carriage as previously mentioned to the upper left of the first work piece to be blasted. The operator will then initiate the "store start point" step 506 (FIG. 20) by pressing button 623 on screen 620 (FIG. 27). Then the carriage is positioned to the lower right via joysticks in step 502C, indicating the lower right of the target blast area. The operator then initiates the "store stop point" step 508 (FIG. 19) via button 623 on the screen 620 of FIG. 27. The operator will then establish desired spacing in step 509, the number of passes step 510, and the number of any repeats step 511 (FIG. 19) by pressing available buttons 643, 644, and/or 645 on screen 640 (FIG. 26). Some harder substances such as granite, for example, may require a larger number of repeats for proper marking. This is done as needed for the particular stone via the touch screen buttons shown by the menu screen displayed by LCD touch screen 70 showing the image of FIG. 26. Once these parameters are entered, the operator may either select to go back to the idle screen 500 via steps 512, 514 (FIG. 20), or the operator may move forward through steps 512 and 513 to repeat the same marking process for any additional monuments. The pattern setup screens are all the same for simplicity and consistency for the operator. Once all patterns are set, the operator then selects the "go to main screen" step 514 (FIG. 20) displayed on the HMI/PLC screen 70.

Figure 20:
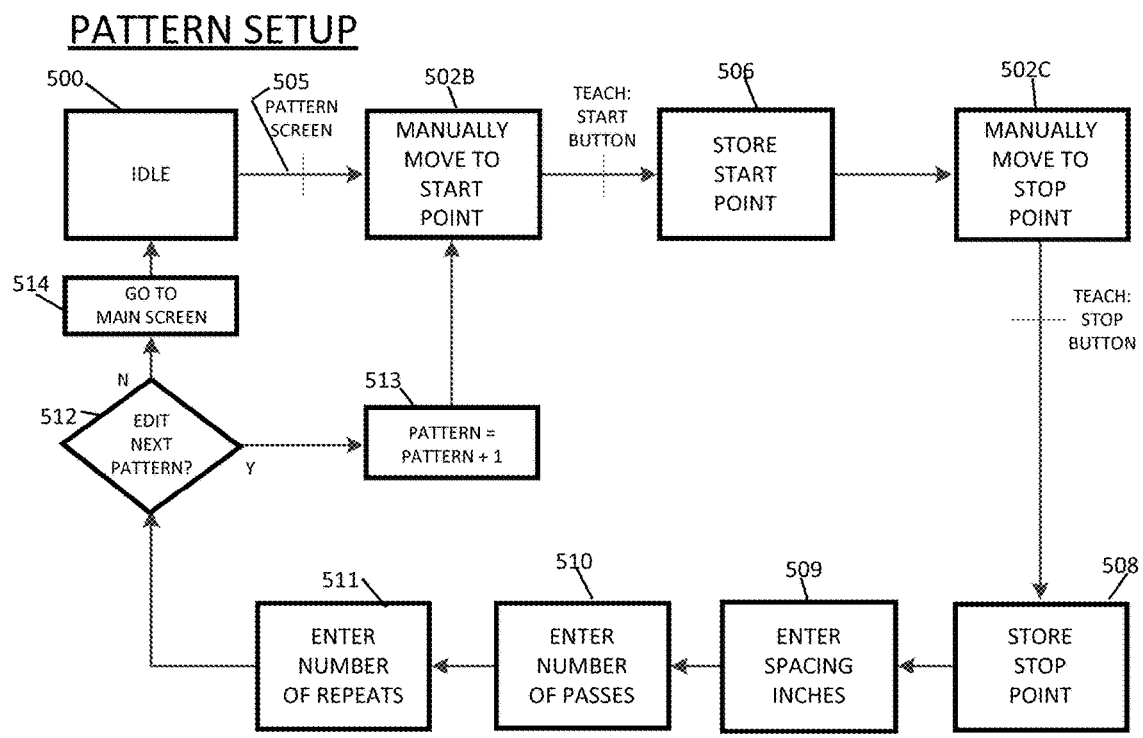
FIG. 20 is a software flow chart of the preferred pattern setup sequence.

In FIG. 20, the program idle step 500 is followed by a pattern screen input 505 followed by step 502B, that manually seeks to determine a start point. The "teach start button" is followed by a "store start point" step 506, followed by a step 502C for manually moving to a stop point. The stop point is stored in step 508. Spacing in inches is entered in step 509. The number of passes is entered in step 510. Step 511 allows selection of the number of repeats, i.e, the number of blasting passes the carriage makes. In step 512, if another pattern is to be edited, step 513 is selected which, after a selection, runs to step 502B. If step 512 selects "no." step 514 returns to the main screen and idle step 500.

Figure 21:
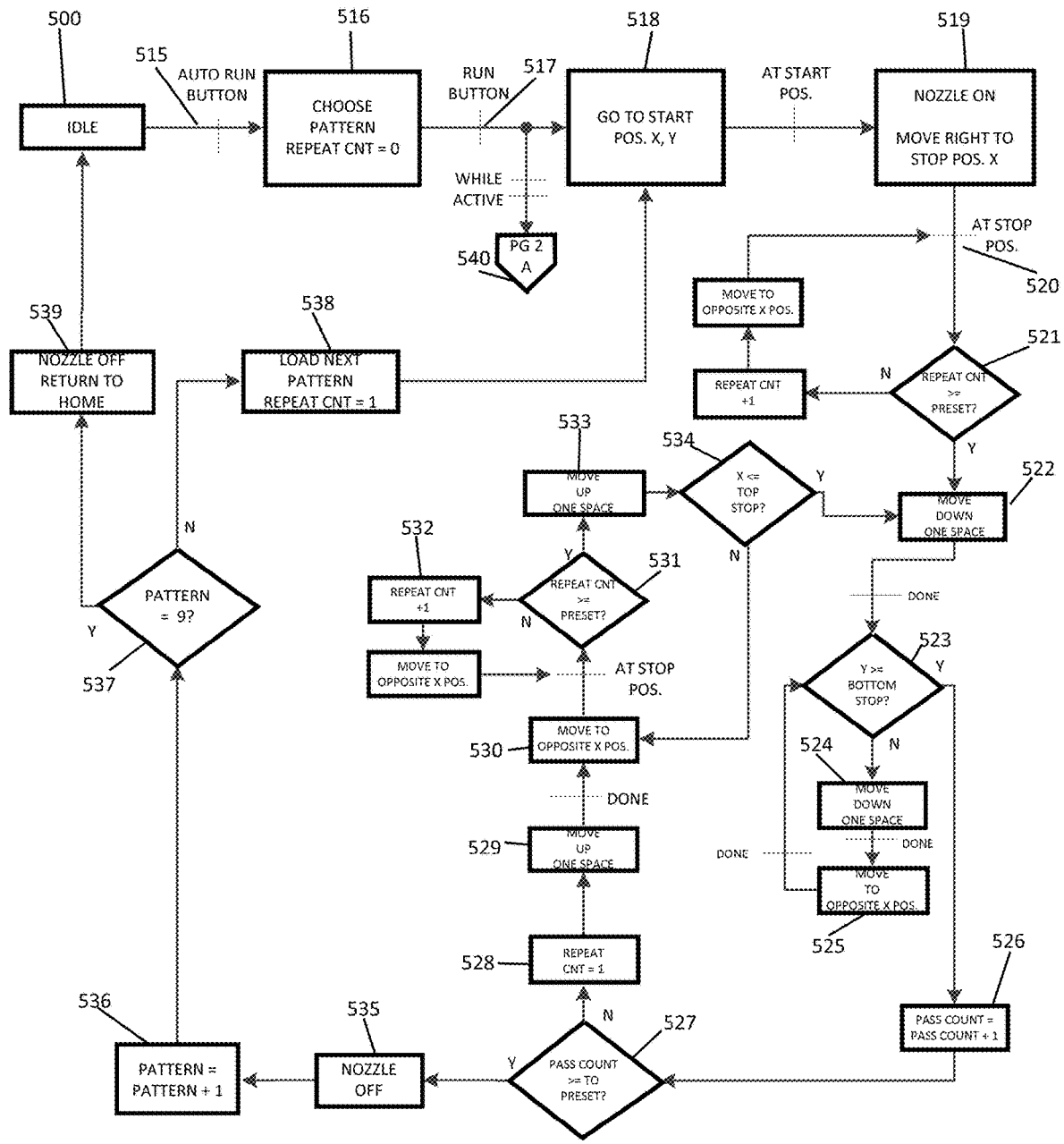
FIG. 21 is a software flow chart of the preferred "auto run" sequence.

It is at this point that the operator may begin the "auto run" sequence for the monuments or objects to be blast-treated. After an idle state 500 (FIG. 21) the "Auto run button" seen on the screen 600 (FIG. 23) selected in step 515 (FIG. 21). In step 516 the operator will then select which "pattern" of several possible patterns to begin with. The operator then presses the start button 646 (FIG. 26) on the touch screen in step 517 of FIG. 21. The carriage-borne jet spray head 215 (FIGS. 11 and 12) will the move to the previously established home position in step 504 (FIG.) as previously defined in the calibrate sequence. At this point the blasting operation will commence. The carriage will move to the first start position in step 518 (FIG. 21), turn on the nozzle in step 519, and begin the blast pattern sequence. The movement will begin on the upper left portion of the work piece moving across to the right to the stop point in step 519 (FIG. 21) comprising the "x" coordinate as previously defined in the pattern setup procedure. The carriage will then move down one space in step 522 and then traverse back left towards the beginning "x" parameter. This will continue in the down fashion, moving left to right and back via steps 523, 524 and 525 again until the "Y" stop coordinate in step 526 (FIG. 21) is reached. This will increase the pass count by 1 in step 527 followed by repeat step 528. In step 529 the PLC will determine if the number of passes parameter has been met; if not, the carriage assembly will move up one spacing through step 529 and continue the left to right and back pattern through successive steps 530-534 to insure that the selected number of passes has been met. Once met, the PLC will increase the pattern number by 1, turn the nozzle off in step 535, increment the pattern count in step 536, and then proceed to the next pattern setup 537 in the que as programmed earlier if there are any.

For example, the pattern 670 of FIG. 27 may be selected and run in step 538 (FIG. 21). Once all patterns have been run, the PLC will then turn off the nozzle 215 in step 539 (FIG. 21) and move the carriage back to the original home (0,0) coordinate location and return to an idle state indicated by step 500.

Figure 22:
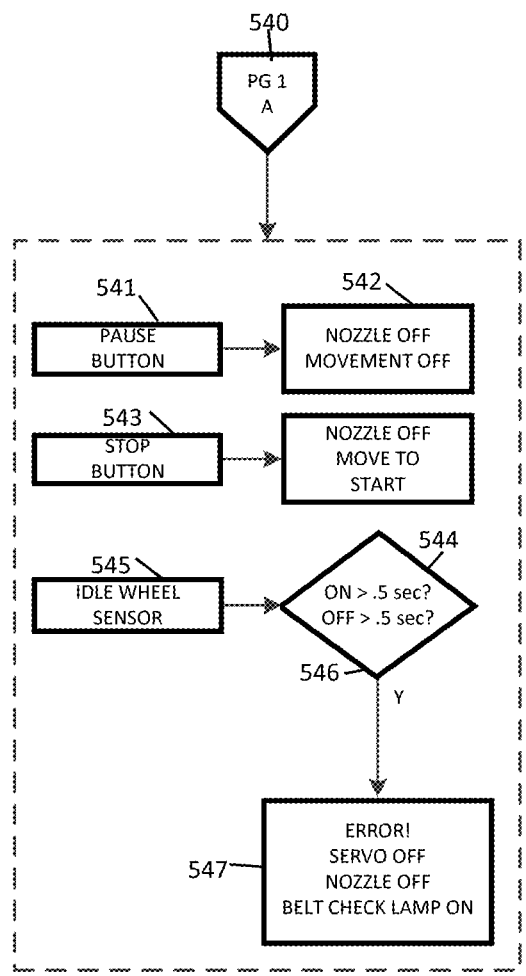
FIG. 22 is a software flow chart of the preferred nozzle control software.
Figure 23:
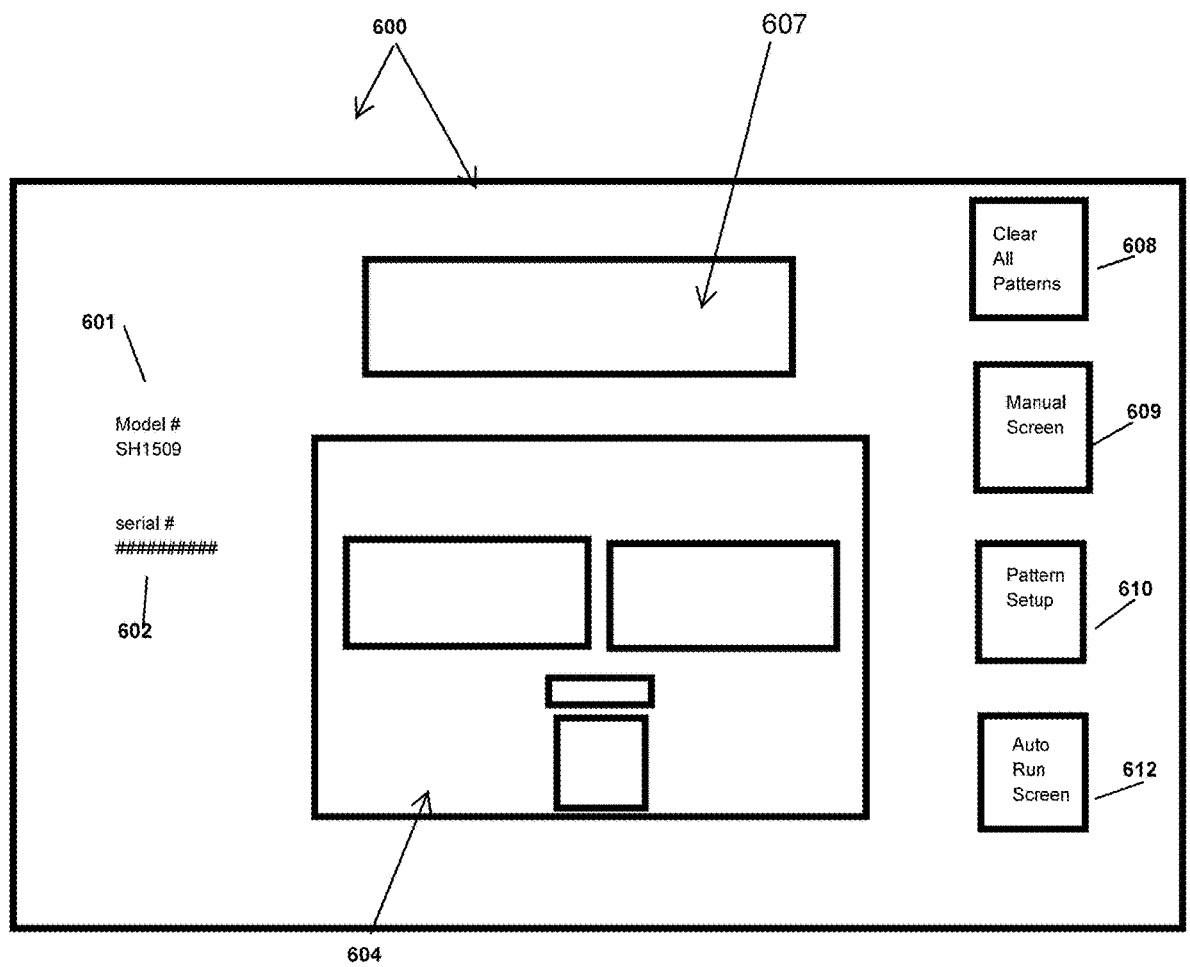
FIG. 23 is a diagrammatic view of the HMI/PLC initial operator menu screen displayed when the machine is first powered "on"

While the auto routine is active, the subroutine of FIG. 22 is active. Step 540 determines if the pause button is pressed in step 541, and if so, then the jet spray nozzle 215 (FIGS. 11 and 12) is turned off and carriage movement stops in step 542. If the stop button is pressed in step 543, the nozzle turns off and the carriage moves back to the home position in step 544.

Step 545 (FIG. 22) reads pulses from the idle wheel sender 279 (FIG. 14) to thus monitor belt movement associated with the carriage drive system. If software monitoring of the Hall effect sensor 279 detects no pulse from rotating sender 275 for a time period greater than one half second through steps 544, 545, and 546, then an error has occurred. This error indicates improper operating of the belt or irregular deflections or wobbling of the idler pulley 257, as would occur during malfunctions. In response to such sensed error, a "check belt" status warning lamp will illuminate at 664 FIG. 26 and turn the jet spray nozzle 215 (FIGS. 11 and 12) off. The nozzle turns off and a belt check warning indicator will illuminate through step 547 (FIG. 22) on the auto run screen alerting the operator to a problem. This is an indication that the drive belt 254 has broken and the carriage is no longer moving horizontally which would lead to a ruined stone. At this point operator must determine what problem exists, such as a broken belt.

FIG. 23 shows the main opening screen menu 600. Item 601 displays the model number of the machine. Item 602 displays the serial number. Block 604 displays a picture of the blasting machine on the LCD screen 70 for decoration. Item 607 shows the logo used on the machines. Selection 608 is a button that will clear all pattern parameters, should the operator desire to do so. Selection 609 will take the operator to the manual screen seen in FIG. 250. Item 610 is a button that will open the pattern setup screens. Item 612 is a button that will open the "auto run" software subroutine and commence "auto run" operation.

Figure 24:
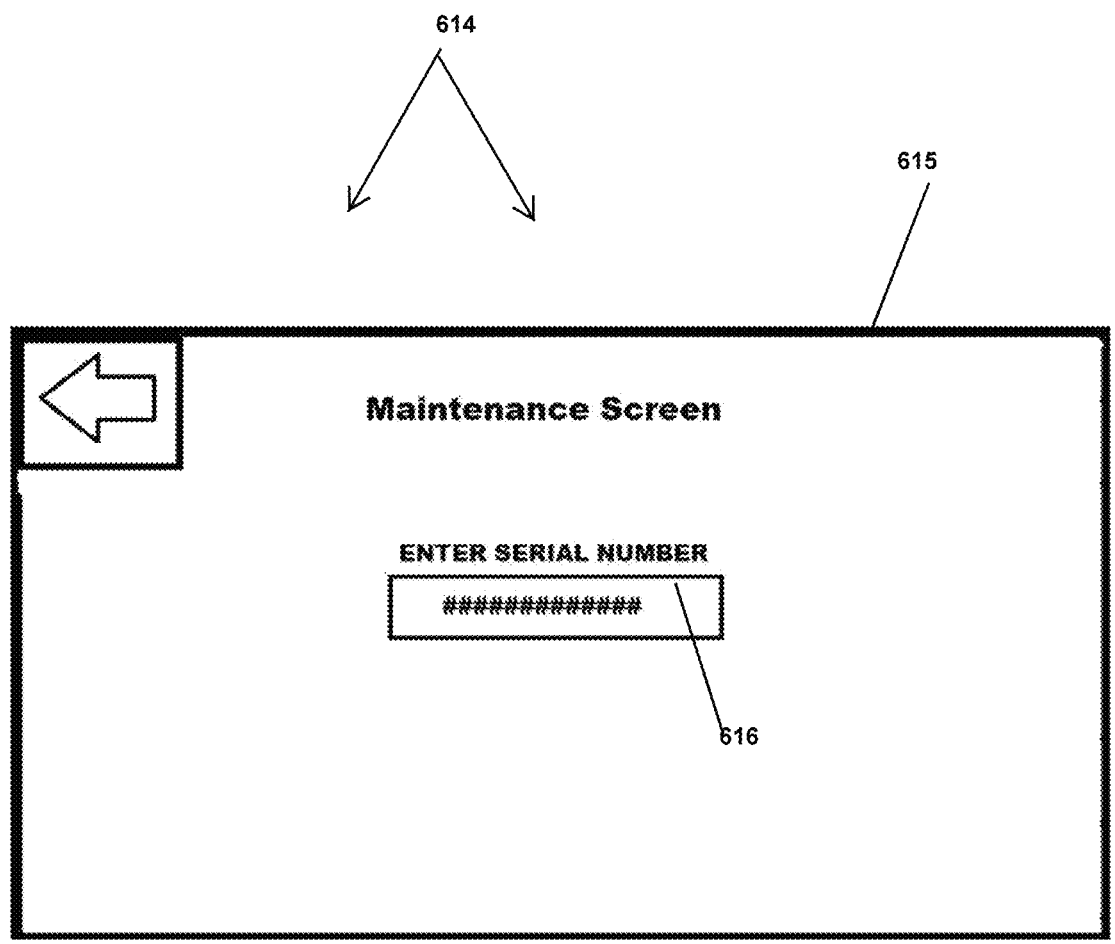
FIG. 24 is a diagrammatic view of the HMI/PLC security input screen.

FIG. 24 shows the maintenance menu 614 available only to the manufacturer. The displayed image 615 shows a block 616 comprising an entry point for the serial number of the machine.

FIG. 25 illustrates the "manual movement" menu 620. Arrow button 621 allows fast return to the beginning menu of FIG. 19. The arrow control buttons 624, 625, 626, and 627, manually manipulate the position of the blast head in order to create the home position. Button 623 can then set this home position into memory. When the go to home button 622 is pressed continuously, the carriage and its blast jet will move to the home position. This screen will also allow the manual movement of the head, and a user can manually blast a project using these buttons, though it is not recommended as the previously described joysticks are available for manual operation. Indicators 628 and 629 display the jet head position.

Run screen 640 (FIG. 26) is displayed when the program begins its auto functions as previously programmed by the user. Button 644 will take the user back to the home screen. Button 642 is where the user defines which pattern number they wish to run by pressing and entering directly the number desired. Buttons 643, 644, and 645 are used to set the desired parameters as needed for the pattern, again by pressing and directly entering the data. Buttons 647 through 654 if pressed will 'NUDGE' the set parameter ⅛ of an inch in the direction pressed, one set for the left stop and one for the right. This is used when the operator sets their pattern incorrectly; corrections can be made on the fly without the need to go through the complete setup again. These are very much like the manual screen arrow buttons with the exception that they are only useful on this screen during a live run of a pattern and any changes made are not retained in memory. Button 646 is the start run button. When pressed, the auto run routine is engaged. Item 663 is the pause button item and 661 is the stop run button. Display box 660 is an information screen indicating whether the blast nozzle is on or not. Display box 664 is a status state indicator which will notify user if the current state is RUNNING, or BELT CHECK warning indicator as needed.

FIG. 27 shows a first pattern setup menu 670. Item 672 is the "back one screen button". The set start position button 673 used in the setting of the start x,y coordinate items 674, 675, 676 are the parameter entry buttons used in delineating the size and scope of the blast pattern to run. Item 677 will take user to the next pattern setup screen 692 (FIG. 28) when pressed. Button 678 when pressed will clear all parameters for this pattern only. Button 679 sets the stop x,y coordinate for the pattern size.

Figure 28:
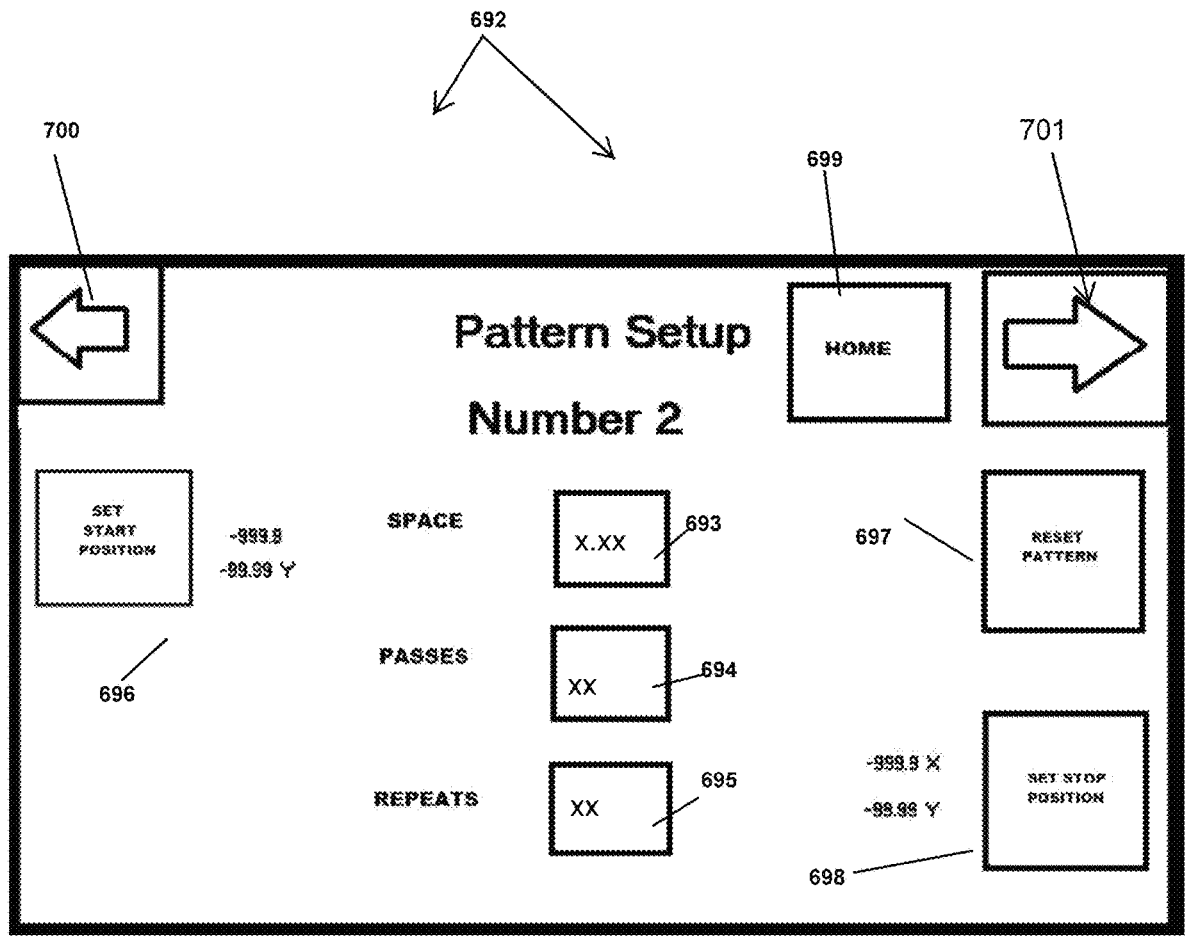
FIG. 28 is a diagrammatic view of an alternative HMI/PLC pattern setup screen.

FIG. 28 shows a second pattern setup menu 692. The "back one screen button" 700 takes the viewer back to screen 670 (FIG. 27). The set start position button 696 used in the setting of the start x,y coordinate items 693, 694, and 695. These are the parameter entry buttons used in delineating the size and scope of the blast pattern to run. Button 701 will take the user to the next pattern setup screen if there is one. Button 697 will clear all parameters for this pattern only. Button 698 sets the stop x,y coordinate for the pattern size.

Auto Run Mode Operation:

The machine begins in an idle state 500, and the "auto run" screen is selected at step 515 (FIG. 210), the pattern number is chosen in step 516, the run button 517 is selected from the touch screen (i.e., looking, for example, at the menu seen in FIG. 27), and the auto-routine begins. The carriage and blast jet 215 (FIGS. 11 and 12) will move to a start position in step 518 for the pattern selected, and once there the nozzle 215 will turn on in step 519. Here the auto-run routine recognizes that it is at the top of the pattern in step 520, and it will repeat any counts as needed in step 521, then move down one number in steps 522-525. Step 523 determines if it is as the bottom of pattern or not. If false, then the carriage will move to an opposite "x" position in step 525 and continue down movement until true. When true, the pass count will be increased by 1 item in step 526, and checking of the pass count proceeds in step 527. if false, then carriage will move up one space in step 529 and move to an opposite "x" position in step 530. The PLC then checks to see if the repeat count is equal to preset, if false, then repeat will occur, if true, then carriage will then move up one spacing in step 533 and check to see if the carriage is at the top of the desired pattern in step 534. If false, then the program loops back to 530 until condition is true. When true, the routine begins at 522 again until the condition is sensed as true in step 527. When true, then step 535 turns the nozzle off and pattern count increases by 1 item in step 536.

The software then queries if all selected patterns have been completed. A maximum of nine is possible. In the latter case, if, the pattern number has increased to 9, as sensed in step 537, the routine end has occurred; if false, then the next pattern is loaded into que 538 and routine begins anew at 518 for this pattern. when pattern query 537 is true then nozzle is turned off and carriage returned to home 539 at which time the PLC returns to an idle state 500 once again.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A sand blasting machine for marking work pieces, the machine comprising:
   an upright cabinet adapted to be disposed upon a supporting surface, the cabinet comprising a pair of spaced apart ends, an inlet, an outlet, and a top;
   a conveyor for supporting work pieces, the conveyor disposed within said cabinet and extending substantially between said cabinet inlet and outlet;
   an elongated actuator assembly horizontally disposed within the cabinet, the actuator assembly comprising an elongated track forming a horizontal pathway, the track comprising a rigid elongated frame;
   a displaceable carriage mounted upon said actuator assembly, the carriage adapted to be coupled to said track for horizontal displacements relative thereto;
   a drive belt disposed within said track frame for horizontally displacing said carriage;
   said actuator assembly comprising a servo motor for operating said drive belt;
   a high pressure nozzle secured to the carriage and aimed at work pieces for blasting work pieces, said nozzle connected to a high pressure source of grit or sand; and,
   an elevator assembly for vertically displacing said actuator assembly.

2. The machine as defined in claim 1 wherein the elevator assembly is mounted atop the cabinet and comprises a servo motor and a spindle driven by said servo motor, and wherein said spindle controls a pair of cables that extend downwardly within said cabinet and connect to said actuator assembly for supporting it and moving it vertically upwardly or downwardly.

3. The machine as defined in claim 2 wherein:
   the track comprises a pair of parallel, spaced-apart, rails; and,
   said carriage comprises upper suspension wheels riding said rails and lower stability wheels that contact an undersurface of said track frame for promoting stability.

4. The machine as defined in claim 2 further comprising a PLC module for controlling the machine, and software for programming the module.

5. The machine as defined in claim 4 further comprising servo drive units driven by said PLC module for controlling said elevator servo motor and said actuator assembly servo motor.

6. The machine as defined in claim 4 wherein the PLC comprises a touch-screen video display visible by an operator that displays machine operation patterns and menus.

7. The machine as defined in claim 3 wherein the cabinet comprises a pair of spaced apart, vertical guide rails, said actuator assembly comprises a pair of spaced apart ends, wherein each end of the actuator assembly comprises buffer wheel assemblies for resisting unwanted torsional displacements and dissipating shocks to the actuator assembly, the buffer wheel assemblies comprising spring loaded radial tensioners for biasing at least a portion of the buffer wheel assemblies towards and into engagement with said vertical guide rails.

8. The machine as defined in claim 7 wherein each guide rail comprises an extrusion of inverted V-shaped profile with a raised apex projecting towards said actuator assembly, the buffer wheel assemblies comprising at least a pair of buffer wheels, at least one buffer wheel riding on each side of said apex.

9. The machine as defined in claim 7 wherein the belt is oriented within the track frame such that the plane of the belt at each side is vertically disposed perpendicularly to ground.

10. The machine as defined in claim 5 wherein the belt is driven by a drive pulley within the actuator assembly that is driven by said actuator assembly servo motor and controlled by said PLC.

11. The machine as defined in claim 10 wherein the belt is entrained about said drive pulley and extends to a spaced-apart idler pulley within said actuator assembly, the idler pulley coupled to an idle-wheel sender proving pulses to an adjacent sensor, for monitoring idle pulley rotation.

12. The machine as defined in claim 11 wherein the sender comprises a plurality of radially spaced-apart magnets disposed about its periphery, whereby said sensor generates electric pulses in response to rotation of said idler pulley that are delivered to said PLC to monitor idler pulley rotation.

13. The machine as defined in claim 12 wherein said sensor comprises a Hall effect sensor.

14. The machine as defined in claim 2 wherein said software comprises:
a calibrate sequence for an initial operating point on a work piece;
a manual entry sequence for moving the sand blasting head to the upper left of the target area to be blasted, the manual entry sequence displaying a menu with a "set-home" button for establishing a start position, the entry sequence comprising buttons for moving the blasting head to a stop position and a button for storing the stop point;
at least one pattern selectable by an operator for blasting a work piece; and,
an "auto run" sequence for processing the work pieces to be blast-treated by moving said carriage between said start point and said stop point a preselected number of times.

15. A sand blasting machine for marking work pieces, the machine comprising:
an upright cabinet adapted to be disposed upon a supporting surface, the cabinet comprising a pair of spaced apart ends, an inlet, an outlet, and a top;
a roller conveyor for supporting work pieces, the conveyor disposed within said cabinet and extending substantially between said cabinet inlet and said cabinet outlet;
an elongated actuator assembly horizontally disposed within the cabinet, the actuator assembly comprising an elongated track forming a horizontal pathway, the track comprising a rigid frame supporting a track, the actuator assembly comprising a displaceable carriage mounted on said track for horizontal displacements relative thereto, the actuator assembly comprising a drive belt for horizontally displacing said carriage and a servo motor for operating said drive belt, the belt oriented such that the plane of the belt is vertically disposed perpendicularly to ground;
a high pressure nozzle secured to the carriage and aimed at work pieces for blasting work pieces, said nozzle connected to a high pressure source of grit or sand;
an elevator assembly for vertically displacing said actuator assembly, the elevator assembly comprising a servo motor, a spindle driven by said motor, and a pair of cables entrained about said spindle that extend downwardly within said cabinet and connect to said actuator assembly for supporting it and moving it vertically upwardly or downwardly; and,
wherein the cabinet comprises a pair of spaced apart, vertical guide rails, and said actuator assembly comprises a pair of spaced apart ends, wherein each end of the actuator assembly ends comprises buffer wheel assemblies for resisting unwanted torsional displacements of said actuator assembly and for dissipating shocks to the actuator assembly, the buffer wheel assemblies comprising at least one spring loaded radial tensioner for biasing at least a portion of the buffer wheel assemblies towards and into engagement with said guide rails.

16. The machine as defined in claim 15 wherein:
the track assembly comprises a pair of parallel, spaced-apart, rails;
said carriage comprises upper suspension wheels riding said rails and lower stability wheels that contact an undersurface of said track for promoting stability.

17. The machine as defined in claim 16 further comprising a PLC module for controlling the machine, software for programming the module, servo drive units driven by said PLC module for controlling said elevator servo motor and said actuator assembly servo motor, and wherein the PLC comprises a touch-screen video display visible by an operator that displays machine operation patterns and menus.

18. A method for sand blasting work pieces, the method comprising the steps of:
providing an upright cabinet with a pair of spaced apart ends, an inlet, an outlet, and a top;
supporting and moving work pieces within said cabinet with a roller conveyor extending substantially between said cabinet inlet and said cabinet outlet;
providing a sand blasting jet;
controlling the jet with an actuator assembly supporting a displacebale carriage traveling on a track for moving the jet;
providing the actuator assembly with a pair of parallel, spaced-apart, rails;
providing said carriage with upper suspension wheels for riding said rails;
stabilizing said carriage with lower stability wheels that contact an undersurface of said actuator assembly;

actuating a drive belt for horizontally displacing said carriage with a servo motor;

orienting the plane of the belt vertically, perpendicularly to ground;

vertically displacing said actuator assembly with an elevator assembly comprising a servo motor, a spindle driven by said servo motor, a pair of cables entrained about said spindle that extend downwardly within said cabinet and connect to said actuator assembly for supporting it and moving it vertically upwardly or downwardly;

stabilizing said actuator assembly with spaced apart buffer wheel assemblies for resisting unwanted torsional displacements of said actuator assembly and for dissipating shocks to the actuator assembly; and, spring biasing at least a portion of the buffer wheel assemblies towards and into engagement with guide rails provided upon interior sides of said cabinet.

19. The method as defined in claim 18 further comprising the steps of controlling the machine with a PLC module, providing software for programming the module, driving servo drive units with said PLC module for controlling said elevator servo motor and said actuator assembly servo motor, and executing software with said PLC to provide a touch-screen video display visible by an operator that displays machine operation patterns and menus.

20. The method as defined in claim 19 further comprising the steps of:

executing a calibrate sequence for an initial operating point on a work piece;

executing manual entry sequence for moving the sand blasting head to the upper left of the target area to be blasted, the manual entry sequence displaying a menu with a "set-home" button for establishing a start position, the entry sequence comprising buttons for moving the blasting head to a stop position and a button for storing the stop point;

enabling selecting of at least one pattern selectable by an operator for blasting a work piece; and, running "auto run" sequence for processing the work pieces to be blast-treated by moving said carriage between said start point and said stop point a preselected number of times.

* * * * *